United States Patent [19]
Kawakura et al.

[11] Patent Number: 5,903,901
[45] Date of Patent: May 11, 1999

[54] MESSAGE TRANSMISSION SCHEME AND PAGE PROCESSING SCHEME FOR HYPERMEDIA DOCUMENT PROCESSING SYSTEM

[75] Inventors: Yasushi Kawakura; Takeshi Aikawa; Akihiko Nakase; Seiji Maeda, all of Tokyo, Japan

[73] Assignee: Kabushiki Kaisha Toshiba, Kawasaki, Japan

[21] Appl. No.: 08/713,075

[22] Filed: Sep. 12, 1996

[30] Foreign Application Priority Data

Sep. 12, 1995 [JP] Japan .................................. 7-234432
Jul. 19, 1996 [JP] Japan .................................. 8-191052

[51] Int. Cl.$^6$ .................................................. G06F 13/14
[52] U.S. Cl. ......................................... 707/501; 707/513
[58] Field of Search ............................ 707/10, 103, 104, 707/501, 513, 514; 345/329, 330, 331; 395/200.33, 200.36, 200.6, 200.68

[56] References Cited

U.S. PATENT DOCUMENTS

| | | | |
|---|---|---|---|
| 5,701,451 | 12/1997 | Rogers et al. | 707/1 |
| 5,706,434 | 1/1998 | Kremen et al. | 395/285 |
| 5,706,507 | 1/1998 | Schloss | 707/104 |
| 5,708,780 | 1/1998 | Levergood et al. | 395/200.3 |
| 5,715,314 | 2/1998 | Graber et al. | 395/200.3 |
| 5,717,860 | 2/1998 | Graber et al. | 707/1 |

OTHER PUBLICATIONS

Opening the HTTP cookie jar, http://www.netscapeworld.com/netscapeworld/nw-07-1996/nw-07-cookies.htm, Jul. 1997, pp. 1–6.

"Book'em Dan-O", http://www.worldwidemart.com/scripts/dano.shtml#readm, Jul. 10, 1996, pp. 1–3.

"Banner Advertising and tracking toolkit", http://www.global-m.com/toolkit.htm, 1996, pp. 1–2.

"Cookie-test", wysiwyg://62//www.bewley.net/perl/cookie-test.htm, Apr. 14, 1997, pp. 1–3.

R. Fielding et al., "Hypertext Transfer Protocol—HTTP/1.1", HTTP Working Group, Internet-Draft, Nov. 22, 1995, pp. 1–80.

*Primary Examiner*—Stephen S. Hong
*Attorney, Agent, or Firm*—Foley & Lardner

[57] ABSTRACT

A message transmission and page processing scheme for a hypermedia document processing system, in which the source information which contains a source server identifier for identifying a source server in the system, a source page identifier for identifying a source page in the system, a request page identifier for identifying the request page in the system, and a request target server identifier for identifying a request target server in the system, is transmitted from a client device to a server device either directly or through a relay server device. A prescribed processing according to the source information is then carried out at the server device. In a case of using the relay server device, the relay server device can counts a number of source information, or separate the source information from a request message transmitted from the client device, or generate the source information from the page message from the server device and the request message from the client device.

41 Claims, 26 Drawing Sheets

MESSAGE TRANSMISSION SCHEME AND PAGE PROCESSING SCHEME FOR HYPERMEDIA DOCUMENT PROCESSING SYSTEM

BACKGROUND OF THE INVENTION

1. Field of the Invention

The present invention relates to a message transmission scheme and a page processing scheme to be used in a system for processing a hypermedia document formed by electronic text and links pointing to that text, and a client device, a server device, and a relay server device for realizing these message transmission scheme and page processing scheme.

2. Description of the Background Art

The hypermedia is a technique which provides means for flexibly accessing multifarious information by relating multimedia data, including such data as text, video, static image, figure, and speech data, through links. A hypermedia document is a multimedia document provided by using this hypermedia technique.

A device which stores and provides a hypermedia document is called server, while a device for acquiring and displaying a hypermedia document is called client.

Now, with reference to FIG. 1, a principle of the hypermedia technique will be described.

FIG. 1 shows three "pages" (page-1 19-1, page-2 19-2 and page-3 19-3) where a "page" is a unit of information provided by the hypermedia technique. Within each page, various information such as text and images are described, and in addition, an "anchor" (such as anchor-1 19-4 and anchor-2 19-5) for pointing to a related information page is embedded. For this reason, by using the anchor-1, for example, it is possible to acquire the page-2 from the page-1.

In order to comprehend a relation, it is often regarded as having a "link" (such as link-A 19-6 and link-B 19-7) which is virtually set up from the anchor-1 to the page-2. A user can acquire the relation information of the page-2 by tracing the link-A from the anchor-1 in the page-1. In addition, a user can also acquire the page-3 by tracing the link-B from the anchor-2 in the page-2. Here, a uniquely defined identifier is used for each page, so that a page can be specified from an anchor without a failure. A processing to search information by tracing links in this manner is called navigation.

As a page identifier for identifying a page and a server identifier for identifying a server which stores that page, the following two schemes are possible.

(1) A page identifier is defined as an information which can identify that page within a network. In this case, a page identifier can be given by a host name which can identify a server which stores that page, and a file, name or (directory name+file name) of that page, for example.

(2) A page identifier is defined as an information which can identify that page within a server which stores that page. Also, a server identifier is defined as an information which can identify that server within a network. Consequently, each page can be identified within a network by a pair of a server identifier and a page identifier.

In the following description, a page identifier and a server identifier as defined in the above scheme (2) will be used, but (server identifier+page identifier) appearing in the following description can be considered as an equivalent of a page identifier in the above scheme (1).

Note that it is also possible to consider a case in which a server identifier alone is set up as a link pointed by an anchor while a default page identifier is set up at the server side, but in such a case, a page identifier corresponding to an anchor is set to be null.

Now, some terminologies which will be used throughout the present specification will be defined.

A "source page" is defined as a page which contains an anchor for generating a page request.

A "source server" is defined as a server which stores the source page.

A "source information" is defined as an information which contains at least an identifier of the source page and an identifier of the source server.

A "request page" is defined as a page which is requested to be acquired and displayed next.

A "request page information" is defined as an information which contains an identifier of the server which stores the request page, and an identifier of the request page.

Now, with reference to FIG. 2, examples of a conventional server and a conventional client will be described.

A server 1-1 has a reception unit 1-2 for receiving a page request (request message), a page memory unit 1-3 for storing hypermedia documents, a request processing unit 1-4 for reading out a necessary page from the page memory unit 1-3 according to a received page request, and a transmission unit 1-5 for transmitting a read out page to a request source.

A client 1-11 has a reception unit 1-12 for receiving a page, a page interpretation unit 1-13 for interpreting a received page in order to display it while outputting an information on a link target page which is requested by an anchor selection command in a currently displayed page, a display unit 1-14 for displaying an interpreted page, an input unit 1-15 for receiving a page request from a user given by an anchor selection command, a request generation unit 1-16 for generating a page acquisition request containing an identifier of a server which stores a request page and an identifier of a request page according to a command from the input unit 1-15 and an information from the page interpretation unit 1-13, a transmission unit 1-17 for transmitting a request message produced from a page acquisition request and a source information, and a source information generation unit 1-18 for producing a source information containing an identifier of a source server which acquired a currently displayed page and an identifier of a current displayed page at a time of requesting a new page.

Note that, in general, as shown in FIG. 2, the server 1-1 and the client 1-11 are connected through a network 1-19, but there may be a case in which functions of both the server 1-1 and the client 1-11 are realized on an identical computer, as in a case of handling hypermedia documents provided on CD-ROM.

Next, with reference to FIG. 3, the operation for requesting a page and generating a source information in a system formed by the conventional server 1-1 and client 1-11 will be described.

At the client 1-11, while a page-A acquired from some server is currently displayed (2-1), when a command (2-2) for tracing an anchor-C on the page-A is entered from the input unit 1-15, the request generation unit 1-16 receives an information (2-3) on a page-B corresponding to the anchor-C from the page interpretation unit 1-13, and produces a page request (2-4).

On the other hand, the source information generation unit 1-18 receives an information (2-5) on a currently displayed page from the page interpretation unit 1-13, and produces a source information (2-6).

Then, the transmission unit 1-17 produces a request message (2-7) from the page request (2-4) and the source information (2-6), and transmits it through the network 1-19 to the server 1-1 which stores a request page.

At the server 1-1 which received this request message, a page request information (2-8) is sent to the request processing unit 1-4, and the page-B (2-9) is read out from the page memory unit 1-3 and transferred to the client 1-11.

When the page-B is successfully acquired from the server 1-1, after a prescribed processing such as interpreting and displaying of the acquired page is carried out, the client 1-11 is set in a state capable of receiving a next page request.

Now, in this server-client system, the source information contained in the received message (2-7) is an information concerning a page which is stored on the other server in general, and this source information has not been utilized effectively in the conventional system.

The prior art regarding the source information includes a reference field defined in Hypertext Transfer Protocol-HTTP/1.0 for specifying link relations in the World Wide Web, which is the worldwide distributed hypermedia.

Note however that this information is useful for a server but useless for a client, and defined as an option which may or may not be sent by a client side. Hypertext Transfer Protocol-HTTP/1.0 mentioned above is disclosed as the Internet Draft as of July, 1995.

Conventionally, the source information can be sent from the client to the request target server by attaching it to the page request, but this source information has not been transmitted to the source server which stores the source page. For this reason, it has been impossible for the source server to learn about a utilization frequency of an anchor in a page.

In addition, in a case where a reference target page is deleted, when an anchor which is referring to that page is traced, it causes an error as it is impossible to reach to that page within a prescribed period of time, so that there is a need to correct this anchor to point to a correct information. However, in the conventional system, no means for enabling the source server side to learn an occurrence of an error at the client has been provided.

In addition, as defined in HTTP/1.0 mentioned above, there is no guarantee that the source information is always produced by every client.

Thus, conventionally, there is no means for enabling the source server to learn the fact of a utilization of an anchor in each page, its utilization frequency, and its utilization result.

SUMMARY OF THE INVENTION

It is therefore an object of the present invention to provide a message transmission scheme and a client device in which it is possible to comprehend a state of references among pages externally.

It is another object of the present invention to provide a page processing scheme and a server device capable of correcting a page stored in that server device according to a state in which another page is referred from that page.

It is another object of the present invention to provide a message processing scheme and a relay server device capable of executing a processing of the source server on behalf of the source server at a time of transferring a message which contains an information concerning an anchor utilization.

It is another object of the present invention to provide a message transmission scheme and a relay server device capable of notifying an information concerning an anchor utilization to the source server, by utilizing an information concerning the source page which is contained in the page request.

It is another object of the present invention to provide a message transmission scheme and a relay server device capable of notifying an information concerning an anchor utilization to the source server, according to a page transfer record and a page request transfer record.

According to one aspect of the present invention there is provided a client device for acquiring and displaying hypermedia documents in a hypermedia document processing system, comprising: display means for interpreting and displaying a first page of the hypermedia documents acquired from one server; first transmission means for transmitting a first message requesting a second page of the hypermedia documents to be referred from the first page currently displayed by the display means to a request target server which stores the second page; and second transmission means for transmitting a second message including a source information which contains (1) a source server identifier for identifying said one server in the system, (2) a source page identifier for identifying the first page in the system, (3) a request page identifier for identifying the second page in the system, and (4) a request target server identifier for identifying the request target server in the system, to either one of said one server or a relay server connected to said one server.

According to another aspect of the present invention there is provided a server device for storing and providing hypermedia documents in a hypermedia document processing system, comprising: transmission means for storing the hypermedia documents and transmitting a first page of the hypermedia documents in response to a request received from a client; reception means for receiving a source information message including a source information which contains (1) a source server identifier for identifying said server device in the system, (2) a source page identifier for identifying the first page in the system, (3) a request page identifier for identifying a second page to be referred from the first page by the client in the system, and (4) a request target server identifier for identifying a request target server which stores the second page in the system; and processing means for carrying out a prescribed processing according to the source information in the source information message received by the reception means.

According to another aspect of the present invention there is provided a relay server device for transferring messages between clients for acquiring and displaying hypermedia documents and servers for storing and providing hypermedia documents in a hypermedia document processing system, comprising: reception means for receiving a source information message from one client which displays a first page of the hypermedia documents acquired from a source server and requesting a second page of the hypermedia documents to be referred from the first page, the source information message including a source information which contains (1) a source server identifier for identifying the source server in the system, (2) a source page identifier for identifying the first page in the system, (3) a request page identifier for identifying the second page in the system, and (4) a request target server identifier for identifying a request target server which stores the second page in the system; and transmission means for storing more than one source information messages received by the reception means, and transmitting stored source information messages to respective source servers.

According to another aspect of the present invention there is provided a relay server device for transferring messages between clients for acquiring and displaying hypermedia documents and servers for storing and providing hypermedia documents in a hypermedia document processing system, comprising: reception means for receiving a first message from one client which is currently displaying a first page of the hypermedia documents acquired from one server, the first message requesting a second page of the hypermedia documents to be referred from the first page to a request target server which stores the second page; and transmission means for generating a second message from the first message received by the reception means, the second message including a source information which contains (1) a source server identify the system said one server in the system, (2) a source page identifier for identifying the first page in the system, (3) a request page identifier for identifying the second page in the system, and (4) a request target server identifier for identifying the request target server in the system, and transmitting the second message to said one server.

According to another aspect of the present invention there is provided a relay server device for transferring messages between clients for acquiring and displaying hypermedia documents and servers for storing and providing hypermedia documents in a hypermedia document processing system, comprising: page transfer means for transferring a page message for a first page of the hypermedia documents from one server to one client, including a source page information which contains a source server identifier for identifying said one server in the system and a source page identifier for identifying the first page in the system; request transfer means for transferring a request message from said one client which is currently displaying the first page of the hypermedia documents acquired from said one server, the request message requesting a second page of the hypermedia documents to be referred from the first page to a request target server which stores the second page, and including a request page information which contains a request page identifier for identifying the second page in the system and a request target server identifier for identifying the request target server in the system; and transmission means for generating a source information message including a source information which contains the source server identifier and the source page identifier obtained from the page message transferred by the page transfer means, and the request page identifier and the request target server identifier obtained from the request message transferred by the request transfer means, and transmitting the source information message to said one server.

According to another aspect of the present invention there is provided a hypermedia document processing system, comprising: a plurality of client devices, including one client device which interprets and displays a first page of the hypermedia documents acquired from one server device; transmits a first message requesting a second page of the hypermedia documents to be referred from the first page to a request target server which stores the second page; and transmits a second message including a source information which contains (1) a source server identifier for identifying said one server device in the system, (2) a source page identifier for identifying the first page in the system, (3) a request page identifier for identifying the second page in the system, and (4) a request target server identifier for identifying the request target server in the system, to said one server device; and a plurality of server devices, including said one server device which stores the hypermedia documents and transmits the first page of the hypermedia documents in response to a request issued by said one client device; receives the second message from said one client device; and carries out a prescribed processing according to the source information in the second message.

According to another aspect of the present invention there is provided a hypermedia document processing system, comprising: a plurality of client devices, including one client device; a plurality of server devices, including one server device; and a relay server device connected between said one client device and said one server device; wherein said one client device interprets and displays a first page of the hypermedia documents acquired from said one server device; transmits a first message requesting a second page of the hypermedia documents to be referred from the first page to a request target server which stores the second page; and transmits a second message including a source information which contains (1) a source server identifier for identifying said one server device in the system, (2) a source page identifier for identifying the first page in the system, (3) a request page identifier for identifying the second page in the system, and (4) a request target server identifier for identifying the request target server in the system, to the relay server device; and the relay server device receives more than one second messages from more than one of the client devices, stores said more than one second messages, and transmits stored second messages to respective source servers; and said one server device which stores the hypermedia documents and transmits the first page of the hypermedia documents in response to a request issued by said one client device; receives the second message from the relay server device; and carries out a prescribed processing according to the source information in the second message.

According to another aspect of the present invention there is provided a hypermedia document processing system, comprising: a plurality of client devices, including one client device; a plurality of server devices, including one server device; and a relay server device connected between said one client device and said one server device; wherein said one client device interprets and displays a first page of the hypermedia documents acquired from said one server device; and transmits a request message requesting a second page of the hypermedia documents to be referred from the first page to a request target server which stores the second page, the request message including a source page information which contains a source server identifier for identifying said one server device in the system and a source page identifier for identifying the first page in the system, and a request page information which contains a request page identifier for identifying the second page in the system and a request target server identifier for identifying the request target server in the system; the relay server device receives the request message transmitted from said one client device; generates a source information message from the request message, the source information message including a source information which contains the source server identifier, the source page identifier, the request page identifier, and the request target server identifier; and transmits the source information message to said one server; and said one server device stores the hypermedia documents and transmits the first page of the hypermedia documents in response to a request issued by said one client device; receives the source information message from the relay server device; and carries out a prescribed processing according to the source information in the source information message.

According to another aspect of the present invention there is provided a hypermedia document processing system, comprising: a plurality of client devices, including one client device; a plurality of server devices, including one server device; and a relay server device connected between said one client device and said one server device; wherein said one client device interprets and displays a first page of the hypermedia documents acquired from one server device; and transmits a request message requesting a second page of the hypermedia documents to be referred from the first page to a request target server which stores the second page, the request message including a request page information which contains a request page identifier for identifying the second page in the system and a request target server identifier for identifying the request target server in the system; said relay server device transfers a page message for the first page from said one server device to said one client device, the page message including a source page information which contains a source server identifier for identifying said one server device in the system and a source page identifier for identifying the first page in the system; transfers the request message from said one client device to said one server device; and generates a source information message including a source information which contains the source server identifier and the source page identifier obtained from the page message, and the request page identifier and the request target server identifier obtained from the request message, and transmits the source information message to said one server device; and said one server device stores the hypermedia documents and transmits the page message for the first page in response to a request issued by said one client device; receives the source information message from the relay server device; and carries out a prescribed processing according to the source information in the source information message.

According to another aspect of the present invention there is provided a method for message transmission by a client device which is interpreting and displaying a first page of the hypermedia documents acquired from one server in a hypermedia document processing system, comprising the steps of: transmitting a first message requesting a second page of the hypermedia documents to be referred from the first page to a request target server which stores the second page; and transmitting a second message including a source information which contains (1) a source server identifier for identifying said one server in the system, (2) a source page identifier for identifying the first page in the system, (3) a request page identifier for identifying the second page in the system, and (4) a request target server identifier for identifying the request target server in the system, to either one of said one server or a relay server connected to said one server.

According to another aspect of the present invention there is provided a method for page processing by a server device which is storing the hypermedia documents and transmitting a first page of the hypermedia documents in response to a request received from a client in a hypermedia document processing system, comprising the step of: receiving a source information message including a source information which contains (1) a source server identifier for identifying said server device in the system, (2) a source page identifier for identifying the first page in the system, (3) a request page identifier for identifying a second page to be referred from the first page by the client in the system, and (4) a request target server identifier for identifying a request target server which stores the second page in the system; and carrying out a prescribed processing according to the source information in the source information message received by the receiving step.

According to another aspect of the present invention there is provided a method for message transmission by a relay server device for transferring messages between clients for acquiring and displaying hypermedia documents and servers for storing and providing hypermedia documents in a hypermedia document processing system, comprising the steps of: receiving a source information message from one client which displays a first page of the hypermedia documents acquired from a source server and requesting a second page of the hypermedia documents to be referred from the first page, the source information message including a source information which contains (1) a source server identifier for identifying the source server in the system, (2) a source page identifier for identifying the first page in the system, (3) a request page identifier for identifying the second page in the system, and (4) a request target server identifier for identifying a request target server which stores the second page in the system; storing more than one source information messages received by the receiving step; and transmitting stored source information messages to respective source servers.

According to another aspect of the present invention there is provided a method for message transmission by a relay server device for transferring messages between clients for acquiring and displaying hypermedia documents and servers for storing and providing hypermedia documents in a hypermedia document processing system, comprising the steps of: receiving a first message from one client which is currently displaying a first page of the hypermedia documents acquired from one server, the first message requesting a second page of the hypermedia documents to be referred from the first page to a request target server which stores the second page; generating a second message from the first message received by the receiving step, the second message including a source information which contains (1) a source server identifier for identifying said one server in the system, (2) a source page identifier for identifying the first page in the system, (3) a request page identifier for identifying the second page in the system, and (4) a request target server identifier for identifying the request target server in the system; and transmitting the second message to said one server.

According to another aspect of the present invention there is provided a method for message transmission by a relay server device for transferring messages between clients for acquiring and displaying hypermedia documents and servers for storing and providing hypermedia documents in a hypermedia document processing system, comprising the steps of: transferring a page message for a first page of the hypermedia documents from one server to one client, the page message including a source page information which contains a source server identifier for identifying said one server in the system and a source page identifier for identifying the first page in the system; transferring a request message from said one client which is currently displaying the first page of the hypermedia documents acquired from said one server, the request message requesting a second page of the hypermedia documents to be referred from the first page to a request target server which stores the second page, and including a request page information which contains a request page identifier for identifying the second page in the system and a request target server identifier for identifying the request target server in the system; generating a source information message including a source information which contains the source server identifier and the source page identifier obtained from the page message, and the request page identifier and the request target server identifier obtained from the request message; and transmitting the source information message to said one server.

According to another aspect of the present invention there is provided a method for message transmission in a hypermedia document processing system formed by a plurality of client devices including one client device which interprets and displays a first page of the hypermedia documents acquired from one server device, and a plurality of server devices including said one server device which stores the hypermedia documents and transmits the first page of the hypermedia documents in response to a request issued by said one client device, the method comprising the steps of: transmitting from said one client device a first message requesting a second page of the hypermedia documents to be referred from the first page to a request target server which stores the second page; transmitting a second message including a source information which contains (1) a source server identifier for identifying said one server device in the system, (2) a source page identifier for identifying the first page in the system, (3) a request page identifier for identifying the second page in the system, and (4) a request target server identifier for identifying the request target server in the system, from said one client device to said one server device; receiving the second message from said one client device at said one server device; and carrying out a prescribed processing according to the source information in the second message at said one server device.

According to another aspect of the present invention there is provided a method for message transmission in a hypermedia document processing system formed by a plurality of client devices including one client device which interprets and displays a first page of the hypermedia documents acquired from one server device, a plurality of server devices including said one server device which stores the hypermedia documents and transmits the first page of the hypermedia documents in response to a request issued by said one client device, and a relay server device connected between said one client device and said one server device, the method comprising the steps of: transmitting from said one client device a first message requesting a second page of the hypermedia documents to be referred from the first page to a request target server which stores the second page; transmitting a second message including a source information which contains (1) a source server identifier for identifying said one server device in the system, (2) a source page identifier for identifying the first page in the system, (3) a request page identifier for identifying the second page in the system, and (4) a request target server identifier for identifying the request target server in the system, from said one client device to the relay server device; receiving more than one second messages from more than one of the client devices and storing said more than one second messages at the relay server device; transmitting stored second messages from the relay server device to respective source servers; receiving the second message from the relay server device at said one server device; and carrying out a prescribed processing according to the source information in the second message at said one server device.

According to another aspect of the present invention there is provided a method for message transmission in a hypermedia document processing system formed by a plurality of client devices including one client device which interprets and displays a first page of the hypermedia documents acquired from one server device, a plurality of server devices including said one server device which stores the hypermedia documents and transmits the first page of the hypermedia documents in response to a request issued by said one client device, and a relay server device connected between said one client device and said one server device, the method comprising the steps of: transmitting from said one client device a request message requesting a second page of the hypermedia documents to be referred from the first page to a request target server which stores the second page, the request message including a source page information which contains a source server identifier for identifying said one server device in the system and a source page identifier for identifying the first page in the system, and a request page information which contains a request page identifier for identifying the second page in the system and a request target server identifier for identifying the request target server in the system; receiving the request message transmitted from said one client device at the relay server device; generates at the relay server device a source information message from the request message, the source information message including a source information which contains the source server identifier, the source page identifier, the request page identifier, and the request target server identifier; transmitting the source information message from the relay server device to said one server; receiving the source information message from the relay server device at said one server device; and carrying out a prescribed processing according to the source information in the source information message at said one server device.

According to another aspect of the present invention there is provided a method for message transmission in a hypermedia document processing system formed by a plurality of client devices including one client device which interprets and displays a first page of the hypermedia documents acquired from one server device, a plurality of server devices including said one server device which stores the hypermedia documents and transmits the first page of the hypermedia documents in response to a request issued by said one client device, and a relay server device connected between said one client device and said one server device, the method comprising the steps of:

transmitting from said one client device a request message requesting a second page of the hypermedia documents to be referred from the first page to a request target server which stores the second page, the request message including a request page information which contains a request page identifier for identifying the second page in the system and a request target server identifier for identifying the request target server in the system; transferring at the relay server device a page message for the first page from said one server device to said one client device, the page message including a source page information which contains a source server identifier for identifying said one server device in the system and a source page identifier for identifying the first page in the system; transferring at the relay server device the request message from said one client device to said one server device; generating at the relay server device a source information message including a source information which contains the source server identifier and the source page identifier obtained from the page message, and the request page identifier and the request target server identifier obtained from the request message; transmitting the source information message from the relay server device to said one server device; receiving the source information message from the relay server device at said one server device; and carrying out a prescribed processing according to the source information in the source information message at said one server device.

According to another aspect of the present invention there is provided an article of manufacture, comprising: a computer usable medium having computer readable program code means embodied therein for causing a computer to function as a client device for acquiring and displaying hypermedia documents in a hypermedia document processing system, the computer readable program code means including: first computer readable program code means for causing said computer to interpret and display a first page of the hypermedia documents acquired from one server; second computer readable program code means for causing said computer to transmit a first message requesting a second page of the hypermedia documents to be referred from the first page to a request target server which stores the second page; and third computer readable program code means for causing said computer to transmit a second message including a source information which contains (1) a source server identifier for identifying said one server in the system, (2) a source page identifier for identifying the first page in the system, (3) a request page identifier for identifying the second page in the system, and (4) a request target server identifier for identifying the request target server in the system, to either one of said one server or a relay server connected to said one server.

According to another aspect of the present invention there is provided an article of manufacture, comprising: a computer usable medium having computer readable program code means embodied therein for causing a computer to function as a server device for storing and providing hypermedia documents in a hypermedia document processing system, the computer readable program code means including: first computer readable program code means for causing said computer to store the hypermedia documents and transmit a first page of the hypermedia documents in response to a request received from a client; second computer readable program code means for causing said computer to receive a source information message including a source information which contains (1) a source server identifier for identifying said server device in the system, (2) a source page identifier for identifying the first page in the system, (3) a request page identifier for identifying a second page to be referred from the first page by the client in the system, and (4) a request target server identifier for identifying a request target server which stores the second page in the system; and third computer readable program code means for causing said computer to carry out a prescribed processing according to the source information in the source information message received by the second computer readable program code means.

According to another aspect of the present invention there is provided an article of manufacture, comprising: a computer usable medium having computer readable program code means embodied therein for causing a computer to function as a relay server device for transferring messages between clients for acquiring and displaying hypermedia documents and servers for storing and providing hypermedia documents in a hypermedia document processing system, the computer readable program code means comprising: first computer readable program code means for causing said computer to receive a source information message from one client which is currently displaying a first page of the hypermedia documents acquired from a source server and requesting a second page of the hypermedia documents to be referred from the first page, the source information message including a source information which contains (1) a source server identifier for identifying the source server in the system, (2) a source page identifier for identifying the first page in the system, (3) a request page identifier for identifying the second page in the system, and (4) a request target server identifier for identifying a request target server which stores the second page in the system; second computer readable program code means for causing said computer to store more than one source information messages received by the first computer readable program code means; and third computer readable program code means for causing said computer to transmit stored source information messages to respective source servers.

According to another aspect of the present invention there is provided an article of manufacture, comprising: a computer usable medium having computer readable program code means embodied therein for causing a computer to function as a relay server device for transferring messages between clients for acquiring and displaying hypermedia documents and servers for storing and providing hypermedia documents in a hypermedia document processing system, the computer readable program code means comprising: first computer readable program code means for causing said computer to receive a first message from one client which is currently displaying a first page of the hypermedia documents acquired from one server, the first message requesting a second page of the hypermedia documents to be referred from the first page to a request target server which stores the second page; second computer readable program code means for causing said computer to generate a second message from the first message received by the first computer readable program code means, the second message including a source information which contains (1) a source server identifier for identifying said one server in the system, (2) a source page identifier for identifying the first page in the system, (3) a request page identifier for identifying the second page in the system, and (4) a request target server identifier for identifying a request target server which stores the second page in the system; and third computer readable program code means for causing said computer to transmit the second message to said one server.

According to another aspect of the present invention there is provided an article of manufacture, comprising: a computer usable medium having computer readable program code means embodied therein for causing a computer to function as a relay server device for transferring messages between clients for acquiring and displaying hypermedia documents and servers for storing and providing hypermedia documents in a hypermedia document processing system, the computer readable program code means comprising: first computer readable program code means for causing said computer to transfer a page message for a first page of the hypermedia documents from one server to one client, the page message including a source page information which contains a source server identifier for identifying said one server in the system and a source page identifier for identifying the first page in the system; second computer readable program code means for causing said computer to transfer a request message from said one client which is currently displaying the first page of the hypermedia documents acquired from said one server, the request message requesting a second page of the hypermedia documents to be referred from the first page to a request target server which stores the second page, and including a request page information which contains a request page identifier for identifying the second page in the system and a request target server identifier for identifying the request target server in the system; third computer readable program code means for causing said computer to generate a source information message including a source information which contains the source server identifier and the source page identifier obtained from the page message transferred by the first computer readable program code means, and the request page identifier and the request target server identifier obtained from the request message transferred by the second computer readable program code means; and fourth computer readable program code means for causing said computer to transmit the source information message to said one server.

Other features and advantages of the present invention will become apparent from the following description taken in conjunction with the accompanying drawings.

DETAILED DESCRIPTION OF THE PREFERRED EMBODIMENTS

Figure 1:
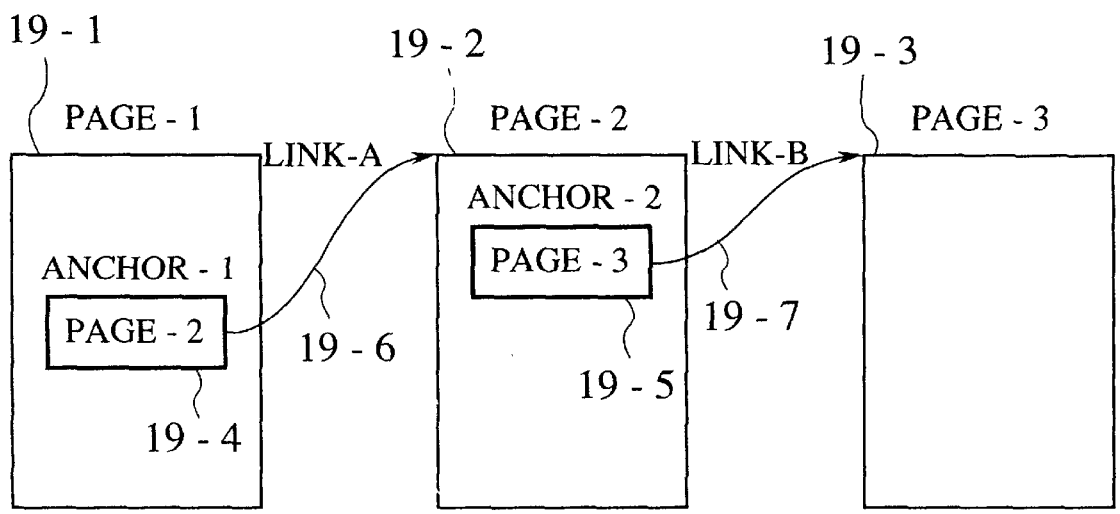
FIG. 1 is a schematic diagram for explaining a principle of hypermedia.

Before the detailed description of the preferred embodiments of the present invention, concepts commonly used in all the embodiments of the present invention will be described.

First, "source information", "source information message", "request page information", and "request message" used in the present invention will be described.

In the hypermedia, except for an initial reference, a reference from one page to another page is made by tracing a link from that one page. As already mentioned above, a page which is a link source is called "source page" while a page which is a link target is a "request page", and the "source page" and the "request page" are linked by an anchor in each page (source page).

Usually, a page has a plurality of anchors, so that when an information on an issued reference request as to from which source page to which request page this reference request is directed to can be obtained, and a provider of each page (source page) can utilize this information for a link management by measuring a utilization frequency of each link (anchor) in the source page and ranking links, by attaching an attribute for emphasizing a display of an anchor with a high utilization frequency, by deleting a link with a low utilization frequency, or by finding a link which is pointing to an non-existing page and deleting such a link, for example.

The "source information" is the conventionally used concept, and it is an information which contains at least a source page identifier and a source server identifier. When at least a source page identifier can be obtained as a part of the source information, this information alone is sufficient to ascertain a number of references from the source page, but when the source page identifier and the request page identifier are paired, it becomes possible to identify an anchor so that the utility value of the information can be increased.

For this reason, in the present invention, a concept of "source information" is expanded in order to make it possible to identify an anchor at the source server side, by requiring the "source information" to contain at least the source page identifier, the source server identifier, and the request page information. Here, as already mentioned above, the "request page information" is an information which contains an identifier of a server which stores the request page and an identifier of the request page. Consequently, the source information used in the present invention can be effectively regarded as a link information or an anchor information.

Also, as already mentioned above, in some types of client, the source information (containing the source server identifier and the source page identifier but not containing the request page information) is attached to the page request message. In contrast, in the present invention, the source information is handled separately from the page request. Namely, in the present invention, a server which stores the request page is given a "request message" which contains an identifier of that server and an identifier of the request page, while the source server is given a "source information message" which contains the source server identifier, the source page identifier, and the request page information.

Next, an "error link" used in the present invention will be described.

An "error link" indicates a link by which an intended page cannot be obtained by tracing it. The error link may includes: (1) a case in which a link was turned into an error link temporarily due to a congestion or a trouble in the network between the client and the server; and (2) a case in which it is necessary to correct or delete a link because a description of a link itself contains an error or a link target page has been erased. In the present invention, the source information (which contains the request page information) is used to detect an error link which requires a correction of a link itself, i.e., a correction of an anchor, and to automatically correct such an error link.

Next, a "link utilization frequency" used in the present invention will be described.

Suppose now a situation where some links are frequently utilized but some other links are hardly utilized when the identical page is referred from a plurality of links. In other words, suppose a situation where some links are frequently utilized but some other links are hardly utilized when a plurality of links are set up from source pages. In such a case, an anchor which has a hardly utilized link and its description page are maintaining an information which is actually useless. In addition, in a case of a page to which anchors are added frequently or in a case of an anchor which requires a considerable time for display, the above situation can cause an additional processing for unnecessary anchor or a lowering of an anchor display processing speed. Consequently, by detecting a hardly utilized anchor and eliminating it according to the source information message, the processing speed can be increased. Of course, as described above, it is also effective to carry out a processing such as that for emphasizing a display of an anchor with a high utilization frequency.

Next, the "relay server" used in the present invention will be described.

There are cases in which the client-server system dealing with hypermedia is equipped with a relay server. The relay server is located between the server which stores an original of a page, and the client in a form of a user terminal, and intermediates a page request from the client to the server and a page transfer from the server to the client. In general, a plurality of clients are connected to one relay server. There are also cases in which relay servers are provided hierarchically.

Figure 2:
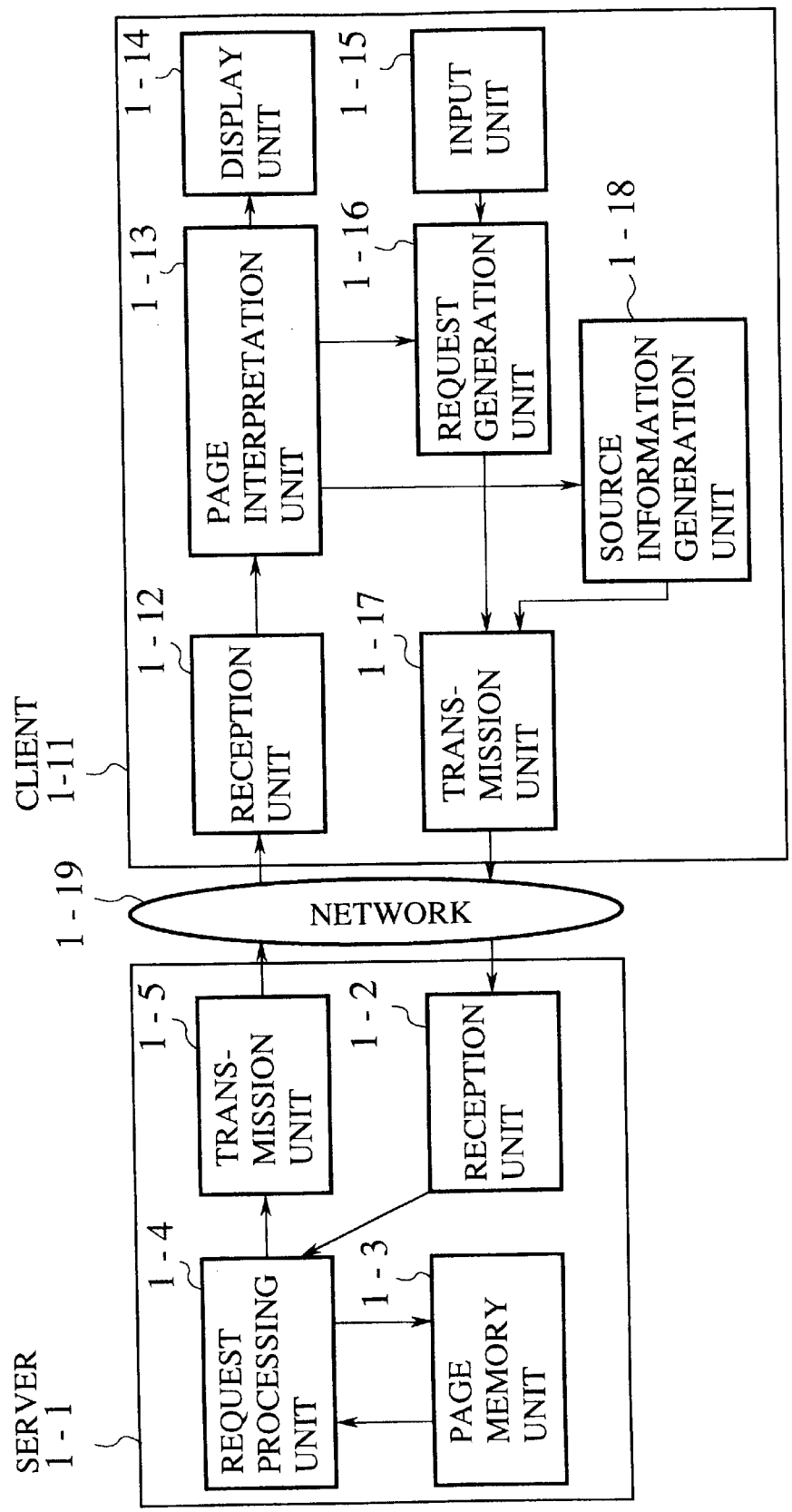
FIG. 2 is a block diagram of an exemplary conventional server-client system.
Figure 4:
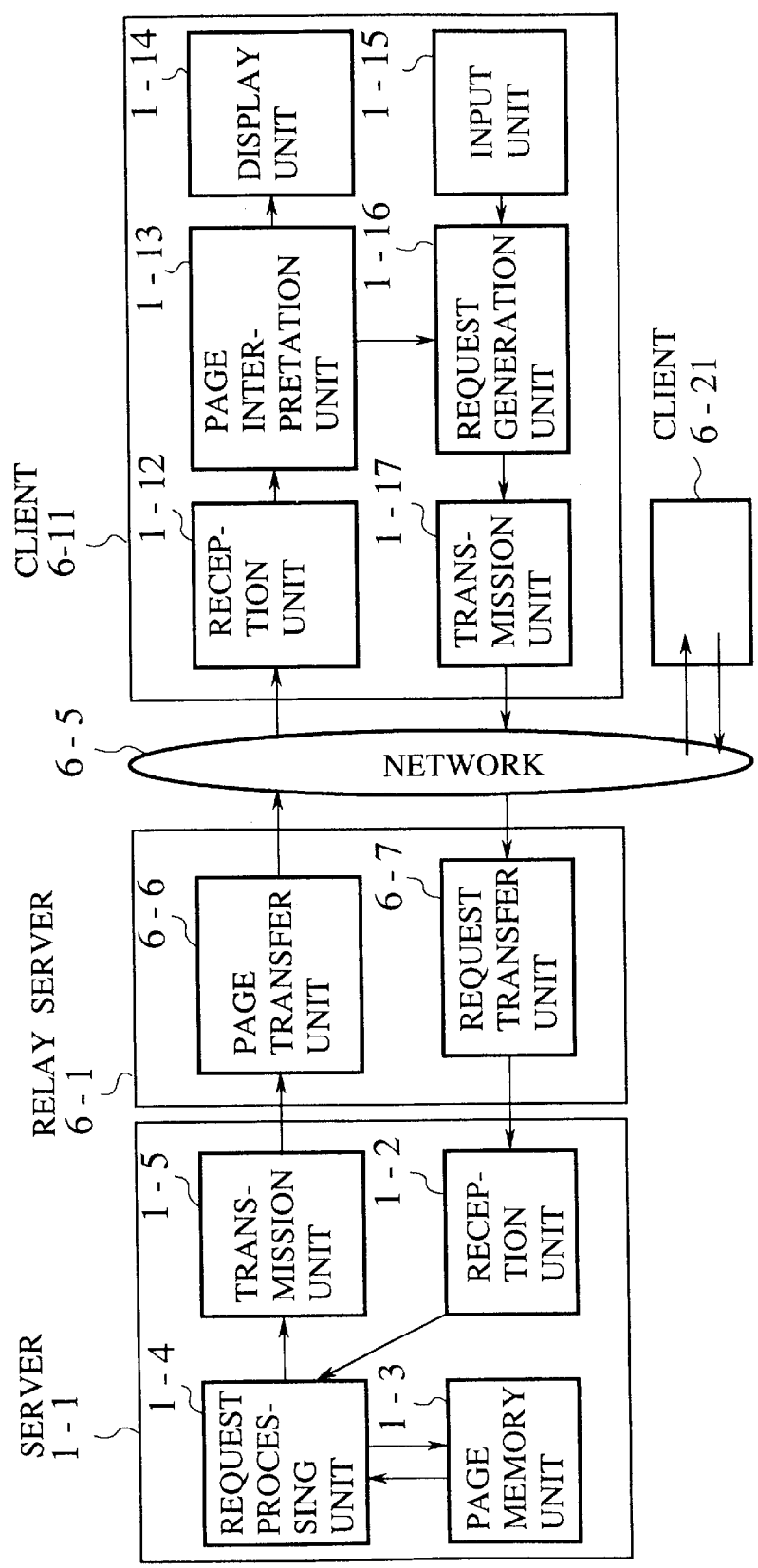
FIG. 4 is a block diagram of an exemplary conventional system using a relay server.

FIG. 4 shows a configuration of a typical conventional relay server, where each one of clients 6-11 and 6-21 is formed by omitting the source information generation unit 1-18 from the client 1-11 shown in FIG. 2, which is a conventional client device of a type which does not transmit the source information.

As shown in FIG. 4, the relay server 6-1 is located between the server 1-1 and the client 6-11. In general, the client and the relay server are often connected through a network 6-5, and in such a case, the relay server 6-1 also carries out transfers of pages and requests for the other client 6-21 as well. A page transfer unit 6-6 of the relay server transfers a page received from the transmission unit 1-5 of the server 1-1 to the reception unit 1-2 of the server 1-1.

Figure 5:
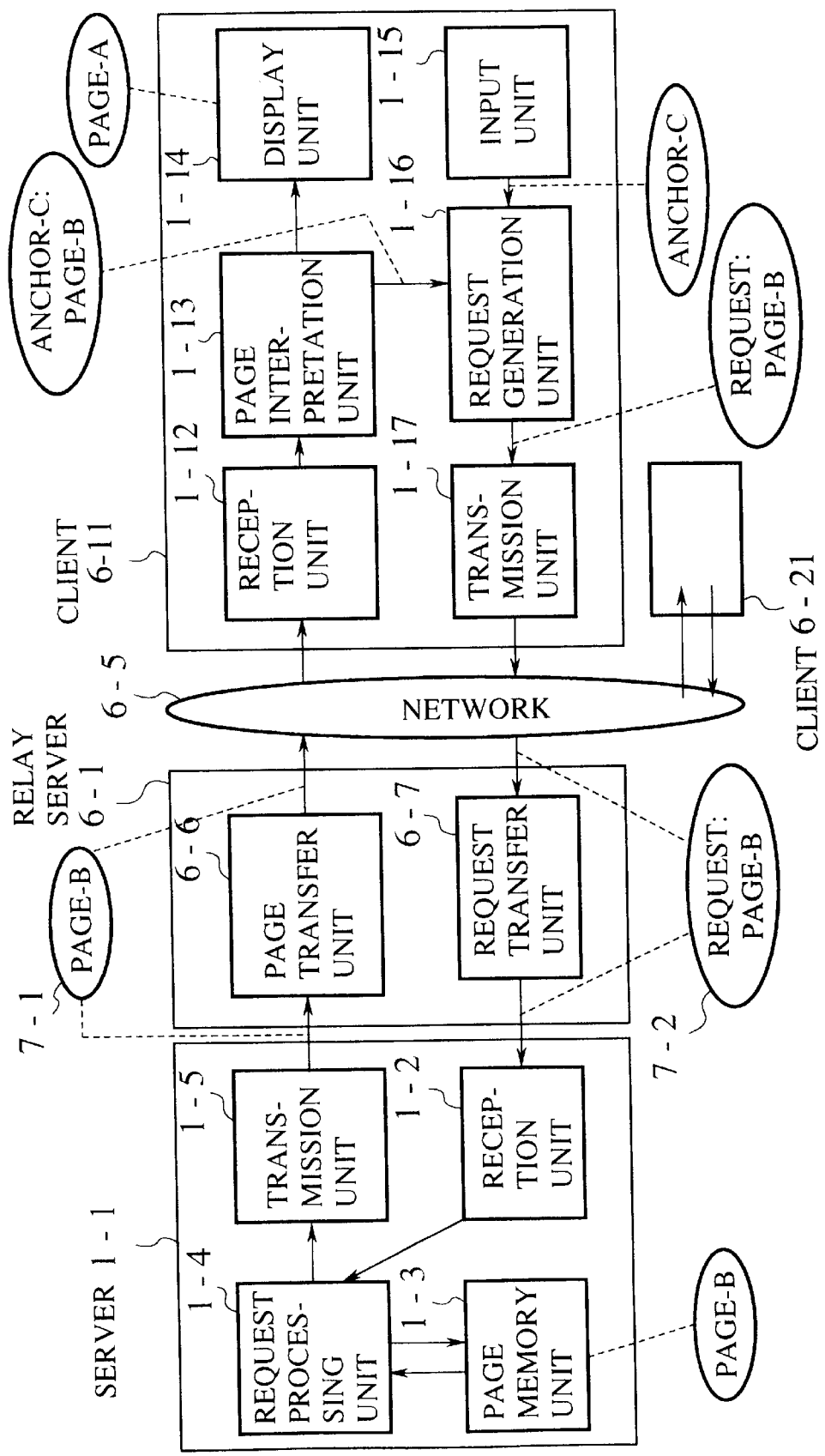
FIG. 5 is a block diagram of the conventional system of FIG. 4 for explaining its operation.
Figure 25:
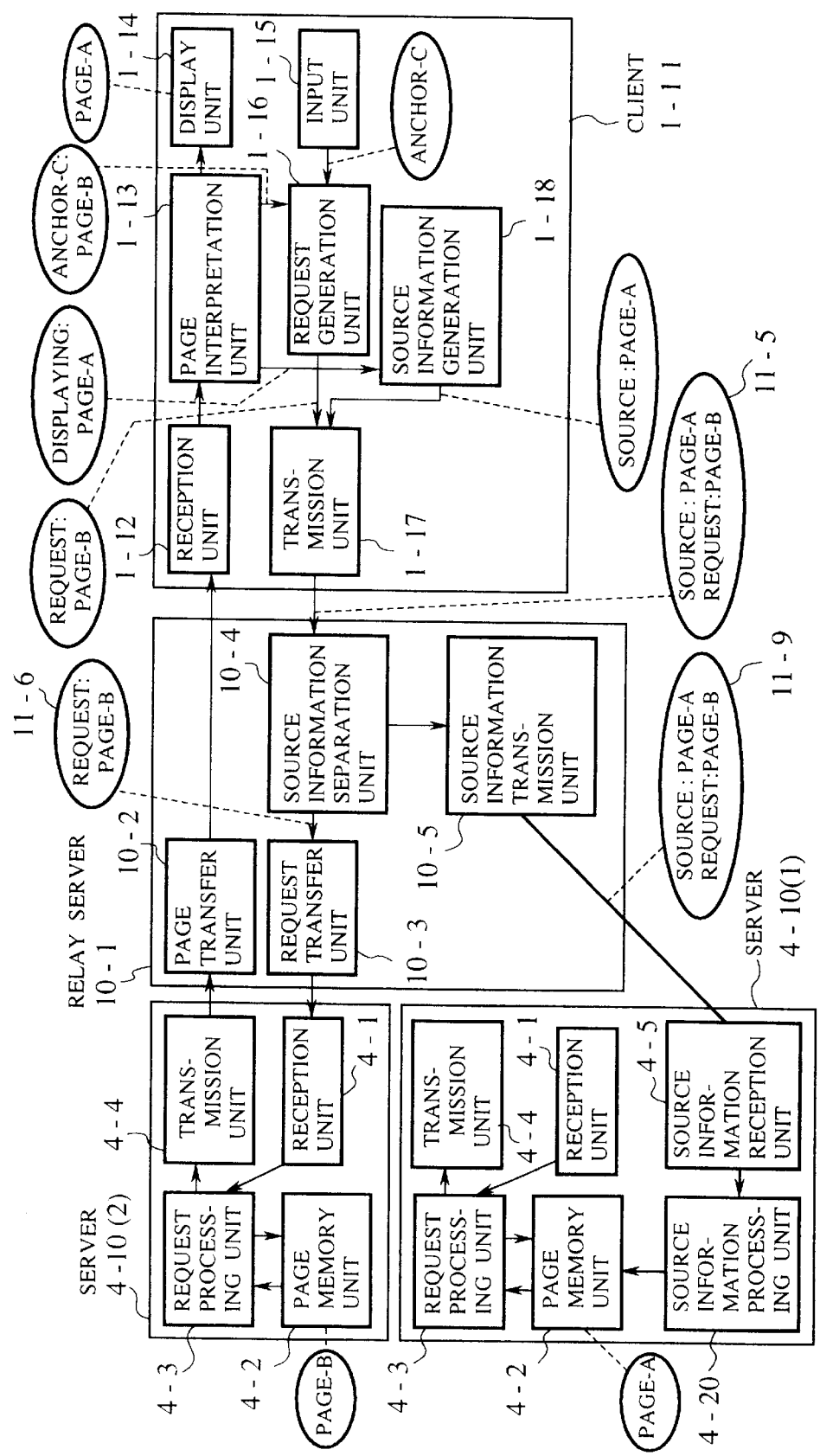
FIG. 25 is a block diagram of a fourth concrete example of a system according to the present invention which uses a relay server device.

FIG. 5 shows the operation in this relay server of FIG. 25. In the conventional relay server, the page (7-1) and the request (7-2) remain unchanged before and after the relay server. Here, there can be a case in which a plurality of relay servers are provided between the client and the server, or a case in which the server and the relay server are connected through a network. The relay server has a function for quickly responding to a repeated request by keeping a transferred page for a certain period of time, as provided by the proxy server of the World Wide Web, and a function for intermediating requests to to another center by being located in a middle of a star connection, as provided in by the broadcast center of the cable TV.

Because the request transfer and the page transfer are intermediated, it is possible to comprehend which page is seen by each client, and the source information can be generated at the page level at least. In order to generate the source information at the anchor level, it suffices to search for an anchor which contains an identifier of a request page from the anchors appearing in a currently displayed page (to which this information was previously transferred).

Referring now to FIG. 6 to FIG. 9, the first embodiment regarding a client device according to the present invention will be described in detail.

Figure 6:
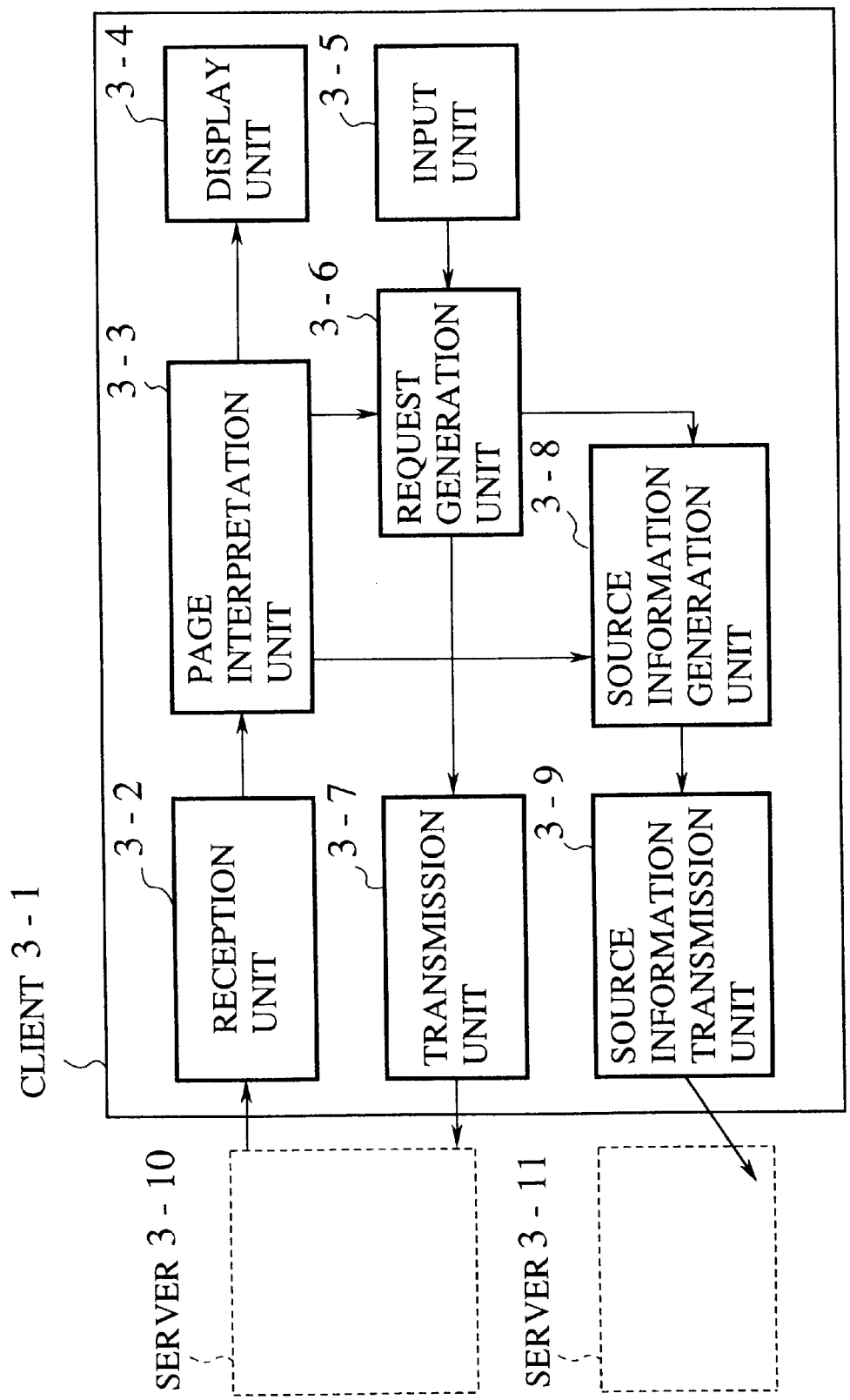
FIG. 6 is a block diagram of a client device in the first and second embodiments of the present invention.

FIG. 6 shows a configuration of a client device in this first embodiment.

This client device 3-1 has: a reception unit 3-2 for receiving a page; a page interpretation unit 3-3 for interpreting a received page in order to display it while outputting an information on a link target page which is requested by an anchor selection command in a currently displayed page; a display unit 3-4 for displaying an interpreted page; an input unit 3-5 for receiving a page request from a user given by an anchor selection command; a request generation unit 3-6 for generating a page acquisition request message containing an identifier of a server which stores a request page and an identifier of a request page according to a command from the input unit 3-5 and an information from the page interpretation unit 3-3; a transmission unit 3-7 for transmitting a generated request message; a source information generation unit 3-8 for generating a source information containing an identifier of a source server which acquired a currently displayed page, an identifier of a current displayed page, an identifier of a server which stores a request page, and an identifier of a request page at a time of requesting a new page; and a source information transmission unit 3-9 for transmitting a source information message containing a produced source information to a server different from a page request target.

In FIG. 6, a server 3-11 is a server which stores a currently displayed page, i.e., the source server, and a server 3-10 is a server which stores a request page.

In this first embodiment, the page request message generated by the request generation unit 3-6 is transmitted to the server 3-10, and independently from this, the source information generated by the source information generation unit 3-8 is transmitted to the source server 3-11 through the source information transmission unit 3-9 as the source information message.

Figure 7:
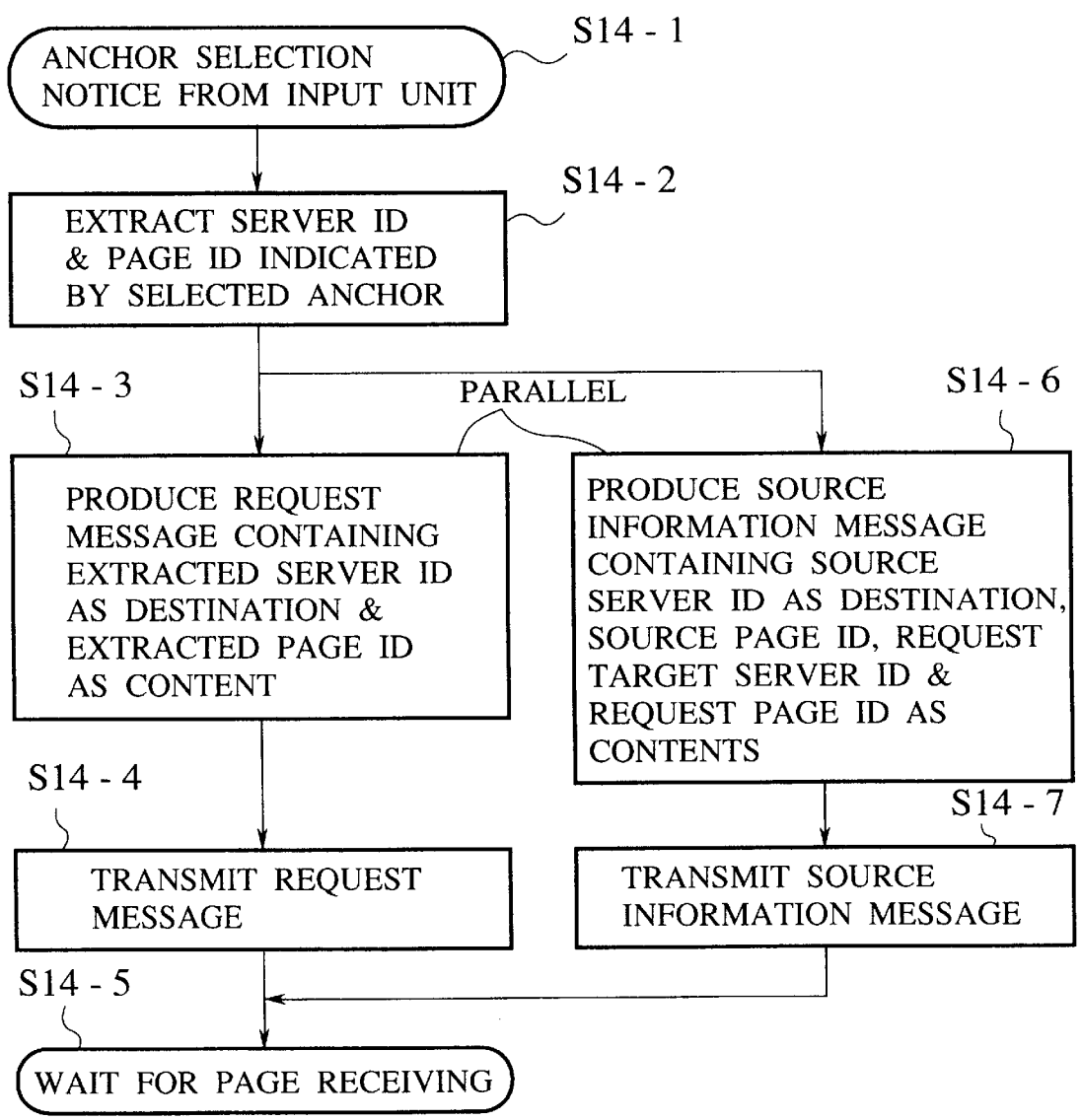
FIG. 7 is a flow chart of an processing carried out by the client device of FIG. 6 in the first embodiment of the present invention.

FIG. 7 shows a flow chart of a processing carried out in the client device 3-1 of FIG. 6 since an anchor selection until a page receiving wait.

Suppose that a page acquired from the server 3-11 was interpreted and is currently displayed at the client 3-1.

Here, at the client 3-1, a user specifies an anchor by using the input device such as a mouse or a touch panel constituting the input unit 3-5.

When an anchor selection notice from the input unit 3-5 is received (step S14-1), an identifier of a server which stores a request page indicated by that anchor and an identifier of that request page are extracted from that anchor (step S14-2). Then, a request message which contains an extracted identifier of a server which stores the request page as a destination and an extracted request page identifier as a content is produced (step S14-3), and this request message is transmitted (step S14-4).

On the other hand, in parallel to the steps S14-3 and S14-4, the source information message which contains an identifier of a server (source server) which stores a currently displayed page (source page) as a destination, and a source page identifier, a request page identifier, and an identifier of a server (request target server) which stores the request page as contents is produced (step S14-6), and this source information message is transmitted (step S14-7).

After all the above steps are finished, a receiving of the request page is awaited (step S14-5).

At the source server which received the source information (which contains the request page information) from the client, the referred anchor can be determined, and a desired processing concerning that anchor can be carried out.

Note that, when a new page is successfully acquired from the server 3-10, after a prescribed processing such as interpreting and displaying of the acquired page is carried out, the client 3-1 is set in a state capable of receiving a next page request.

Now, a system construction in a form of a software program for this first embodiment will be described.

The request generation unit 3-6 of FIG. 6 can be provided in a form of a program describing functions of the steps S14-2 and S14-3 of FIG. 7, while the source information generation unit 3-8 of FIG. 6 can be provided in a form of a program describing functions of the steps S14-6 of FIG. 7. Also, the transmission unit 3-2 and the source information transmission unit 3-9 of FIG. 6 can be provided in forms of programs describing functions of the steps S14-4 and S14-7 of FIG. 7, respectively. These programs can be stored in a recording medium. Then, this recording medium can be installed into a computer machine having a page display function, an anchor selection input function, and a function to communicate with servers which store page pages, and executed at a timing of a page request command which is issued when a user selects an anchor.

Next, a first modification of the above described first embodiment will be described. In this first modification, the configuration of the client device is the same as that shown in FIG. 6.

Figure 8:
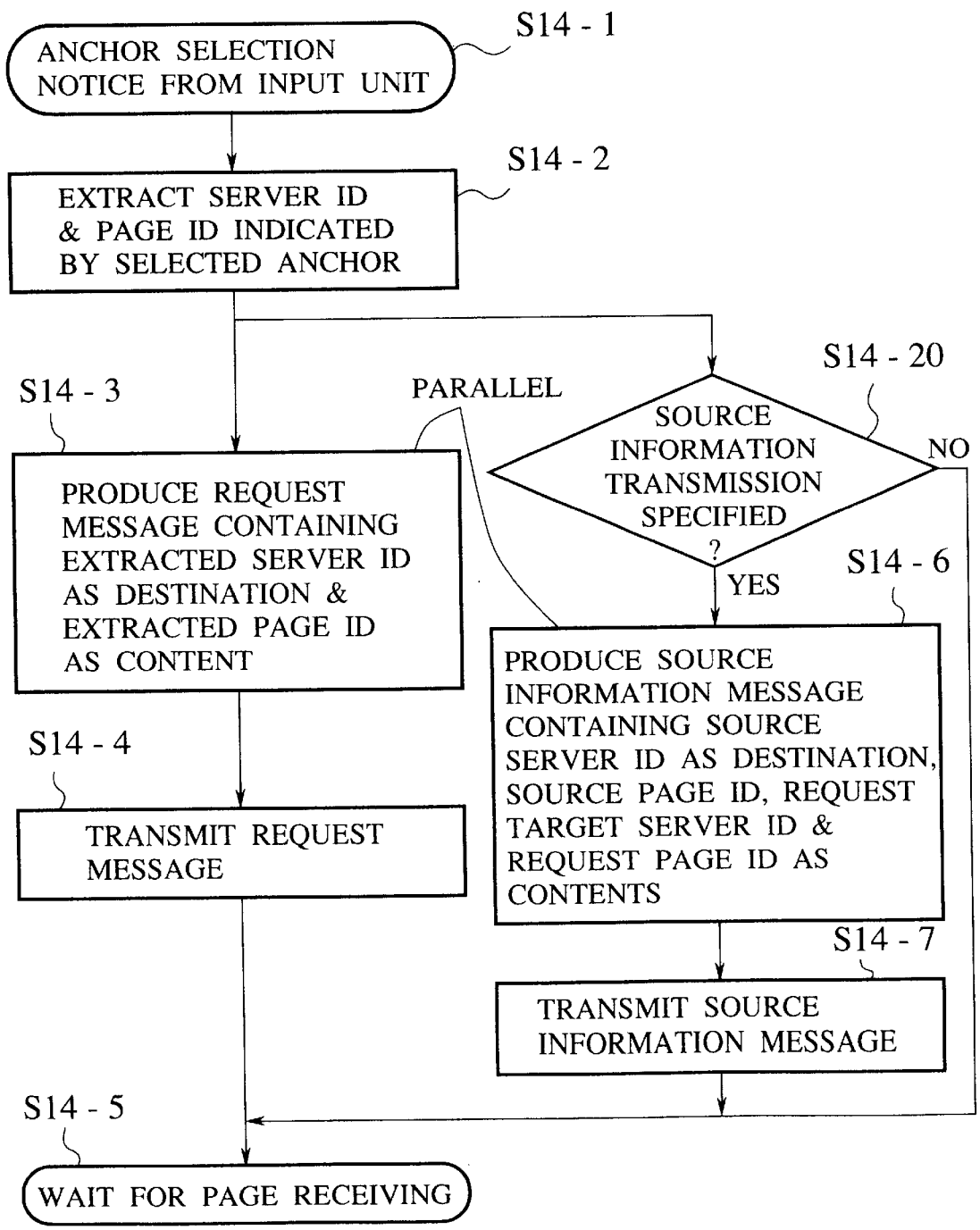
FIG. 8 is a flow chart of an processing carried out by the client device of FIG. 6 in the first modification of the first embodiment of the present invention.

FIG. 8 shows a flow chart of a processing carried out in the client device of this first modification since an anchor selection until a page receiving wait.

In the processing of FIG. 7, the source information message is transmitted to the source server whenever a link target page is requested by an anchor selection command, but in this first modification, the source information is transmitted only to a source server for which a transmission of the source information is specified in advance. In this manner, it is possible to reduce an amount of communications required for the source information message transmission while satisfying the need of the source server.

As for a method for specifying a transmission of the source information in advance, the following two methods are possible.

(1) a method for specifying a transmission link by link:
For each anchor, in addition to the description of a link target page identifier and an identifier of a server which stores a link target page, an attribute information indicating whether the source information is to be transmitted, or not is attached, or a destination requiring the source information transmission is attached only when the source information transmission is to be specified.

More specifically, in a case of HTML, for example, when a link for which the source information transmission is not specified is described as:

<A HREF=http://src2/page2'>link to page2</A> a source information transmission specification TELL can be added to the above description as:

<A HREF=http://src2/page2' TELL='http://src1/page1'>link to page2</A> in a case of specifying the source information transmission.

(2) a method for specifying a transmission page by page:
To a header of each page, a flag indicating whether the source information is to be transmitted or not is provided, or a destination requiring the source information transmission is attached only when the source information transmission is to be specified.

In either method, whether the source information transmission is specified or not can be checked by the page interpretation unit 3-3.

In the processing of FIG. 8 for this first modification, while displaying the source page, when an anchor selection notice from the input unit 3-5 is received (step S14-1), the request message is produced and transmitted similarly as in a case of FIG. 7 (steps S14-2, S14-3 and S14-4).

Meanwhile, whether the source information transmission is specified or not is checked for the selected anchor or the the source page (step S14-20), and when the source information transmission is specified, the source information message is produced and transmitted similarly as in a case of FIG. 7 (steps S14-6 and S14-7), whereas otherwise the source information is not produced.

Next, a second modification of the above described first embodiment will be described. In this second modification, the configuration of the client device is the same as that shown in FIG. 6.

Figure 9:
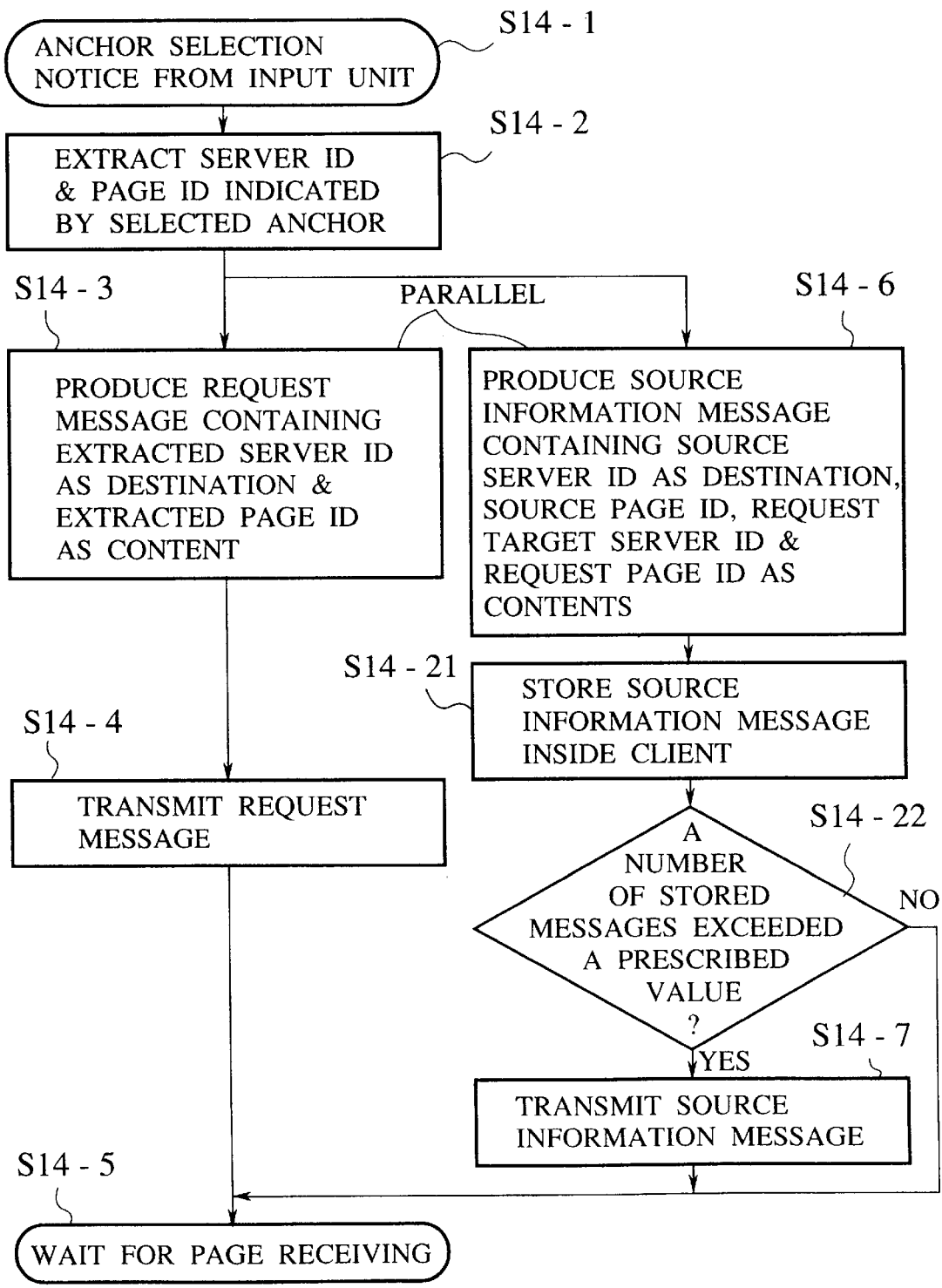
FIG. 9 is a flow chart of an processing carried out by the client device of FIG. 6 in the second modification of the first embodiment of the present invention.

FIG. 9 shows a flow chart of a processing carried out in the client device of this second modification since an anchor selection until a page receiving wait.

In the processing of FIG. 7, the source information message is transmitted to the source server whenever a link target page is requested by an anchor selection command, but in this second modification, the source information is not transmitted immediately but stored once, and when a number of stored source information messages exceeded a prescribed value, all the stored source information messages are transmitted altogether. In this manner, it is possible to reduce an amount of communications required for the source information message transmission.

As for a method for realizing this second modification, the following three methods are possible.

(1) a method for counting stored messages link by link:
In storing the source information messages, a number of stored messages is counted by using the source server identifier, the source page identifier, the request target server identifier, and the request page identifier as keys. Then, the source information messages for an anchor for which the counted number of stored messages exceeded a prescribed value are transmitted altogether.

(2) a method for counting stored messages source page by source page:

In storing the source information messages, a number of stored messages is counted by using the source server identifier and the source page identifier as keys. Then, the source information messages having the source server identifier and the source page identifier for which the counted number of stored messages exceeded a prescribed value are transmitted altogether.

(3) a method for counting stored messages server by server:

In storing the source information messages, a number of stored messages is counted by using the source server identifier as a key. Then, the source information messages having the source server identifier for which the counted number of stored messages exceeded a prescribed value are transmitted altogether.

In the processing of FIG. 9 for this second modification, while displaying the source page, when an anchor selection notice from the input unit 3-5 is received (step S14-1), the request message is produced and transmitted while the source information message is produced similarly as in a case of FIG. 7 (steps S14-2, S14-3, S14-4 and S14-6).

After the step S14-6, the produced source information message is not immediately transmitted and stored once inside the client (step S14-21). Then, whether a number of stored source information messages exceeded a prescribed value or not is checked (step S14-22), and when a counted number of stored source information messages exceeded a prescribed value, the corresponding source information messages for which a number of stored source information messages exceeded a prescribed value are transmitted altogether (step S14-7).

Note that the stored source information messages are transmitted altogether in the above description, but it is also possible to store the source information message for one anchor only when it is produced for the first time (since the last transmission), and count a number of the subsequently produced source information messages for the same one anchor, and when a counted value exceeds a prescribed value, transmit the stored source information message by attaching an information on a number of references made.

Also, in a case of transmitting the source information message by attaching a variable information which changes in time such as a time at which the anchor is selected, it is preferable to separately store that variable information at a time of counting the stored source information messages, and attach the stored variable information to the source information messages at a time of transmitting the source information messages.

In these cases, it is also possible to use any of (1) a method for counting stored messages link by link, (2) a method for counting stored messages source page by source page, and (3) a method for counting stored messages server by server.

Note that it is also possible to combine the first modification and the second modification described above, so that the source information messages are to be transmitted altogether after a number of stored messages exceeded a prescribed value, only when the source information transmission is specified in advance.

Figure 10:
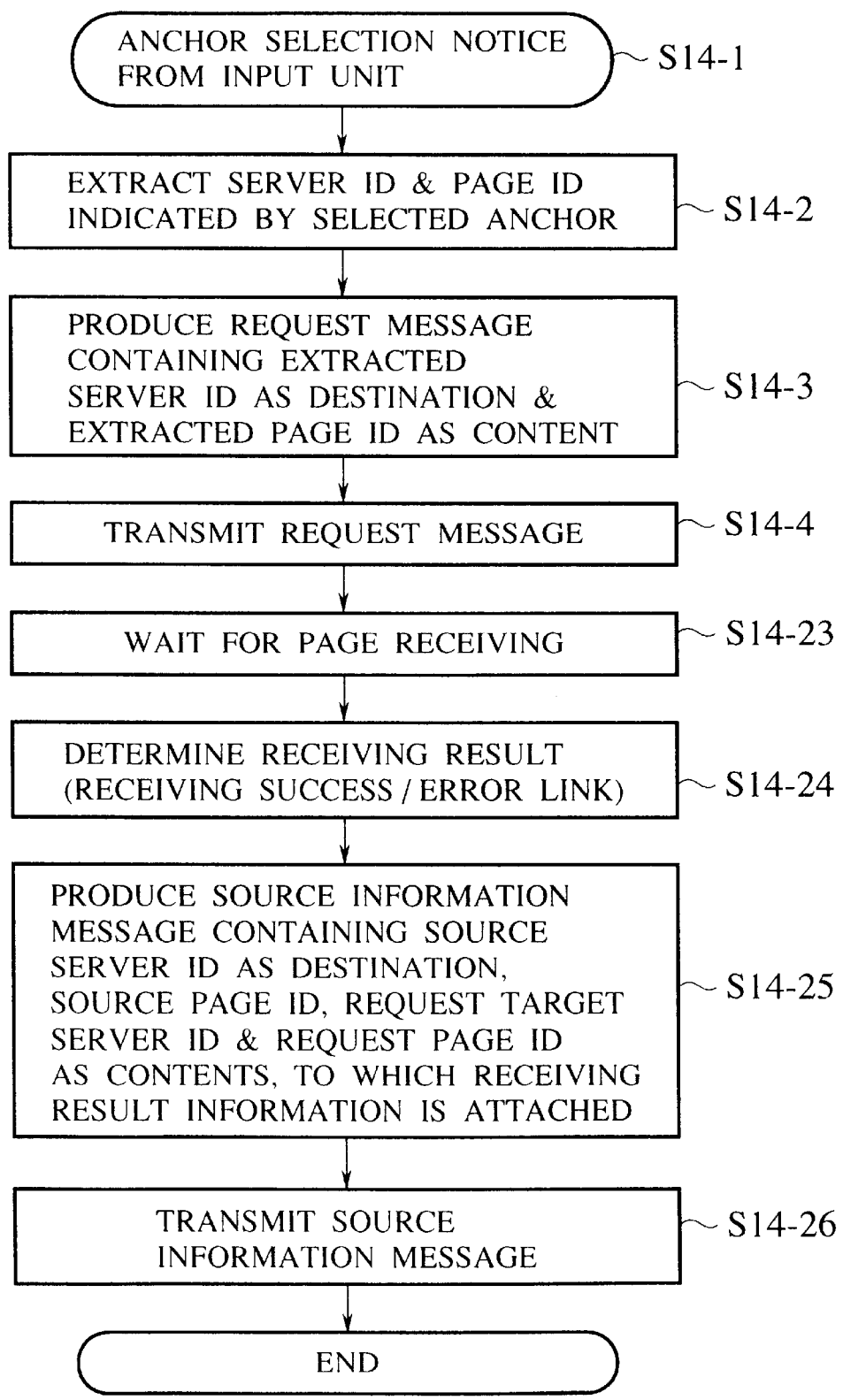
FIG. 10 is a flow chart of an processing carried out by the client device of FIG. 6 in the second embodiment of the present invention.

Referring now to FIG. 10, the second embodiment regarding a client device according to the present invention will be described in detail. In this second embodiment, the configuration of the client device is the same as that shown in FIG. 6.

FIG. 10 shows a flow chart of a processing carried out in the client device of this second embodiment since an anchor selection until a source information message transmission.

In the first embodiment described above, when a link target page is requested by the anchor selection command, the source information message is transmitted as an evidence for an occurrence of a referring. However, there is no guarantee for receiving the request page successfully as a result of transmitting the request message, and there are case in which the request ends up with an error as mentioned above. For this reason, in this second embodiment, a request page receiving result is attached to the source information message and transmitted to the source server. By means of this, it becomes possible for the source server to comprehend not just a number of references but also an occurrence of an error link.

More specifically, the processing carried out in the client device of this second embodiment proceeds according to the flow chart of FIG. 10 as follows.

Suppose that a page acquired from the server 3-11 was interpreted and is currently displayed at the client 3-1.

Here, at the client 3-1, a user specifies an anchor by using the input device such as a mouse or a touch panel constituting the input unit 3-5.

When an anchor selection notice from the input unit 3-5 is received (step S14-1), an identifier of a server which stores a request page indicated by that anchor and an identifier of that request page are extracted from that anchor (step S14-2). Then, a request message which contains an extracted identifier of a server which stores the request page as a destination and an extracted request page identifier as a content is produced (step S14-3), and this request message is transmitted (step S14-4). Then, a receiving of the request page is awaited (step S14-23).

At this point, the receiving result is determined as a receiving success when the request page was successfully acquired, whereas the receiving request is determined as an error link when the request page was not received for various reasons (step S14-24).

Then, after the receiving result is determined, the source information message which contains an identifier of a server (source server) which stores a currently displayed page (source page) as a destination, and a source page identifier, a request page identifier, and an identifier of a server (request target server) which stores the request page as contents, and to which an information on the determined receiving result is attached is produced (step S14-25), and this source information message is transmitted (step S14-26).

Note that, when a new page is successfully acquired from the server 3-10, after a prescribed processing such as interpreting and displaying of the acquired page is carried out, the client 3-1 is set in a state capable of receiving a next page request.

At the source server which received the source information (which contains the request page information and the receiving result information) from the client, the referred anchor can be determined, and a desired processing concerning that anchor can be carried out.

Note also that this second embodiment can also be modified in a manner of the first modification, or the second modification, or their combination described for the first embodiment, so that the source information message is transmitted according to the transmission specification, or the source information messages are stored once and transmitted altogether, or only the source information messages whose transmissions are specified are stored once and transmitted altogether.

Note also that the receiving result indicating the receiving success or the error link is notified from the client to the source server in the above, but it is also possible to notify an information which indicates an error content of the error link, such as an error related to the congestion of the network or an error due to non-existence of a link target page. It is also possible to notify an error message only when the error content of the error link indicates an error due to non-existence of a link target page.

It is also possible to store a prescribed number of the source information messages before transmission in a case of the receiving success, while immediately transmitting the error message in a case of the error link.

Figure 11:
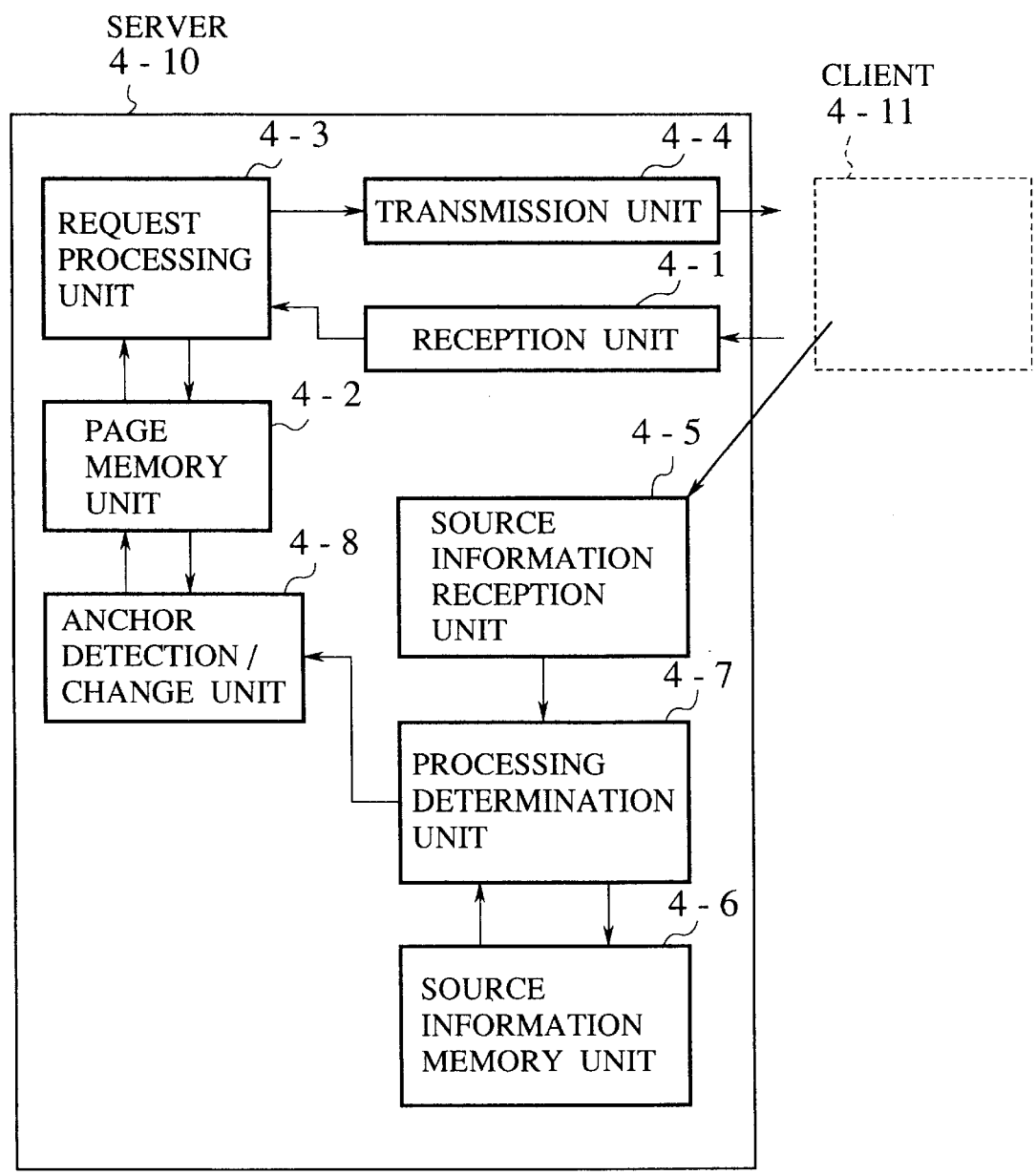
FIG. 11 is a block diagram of a server device in the third embodiment of the present invention.
Figure 12:
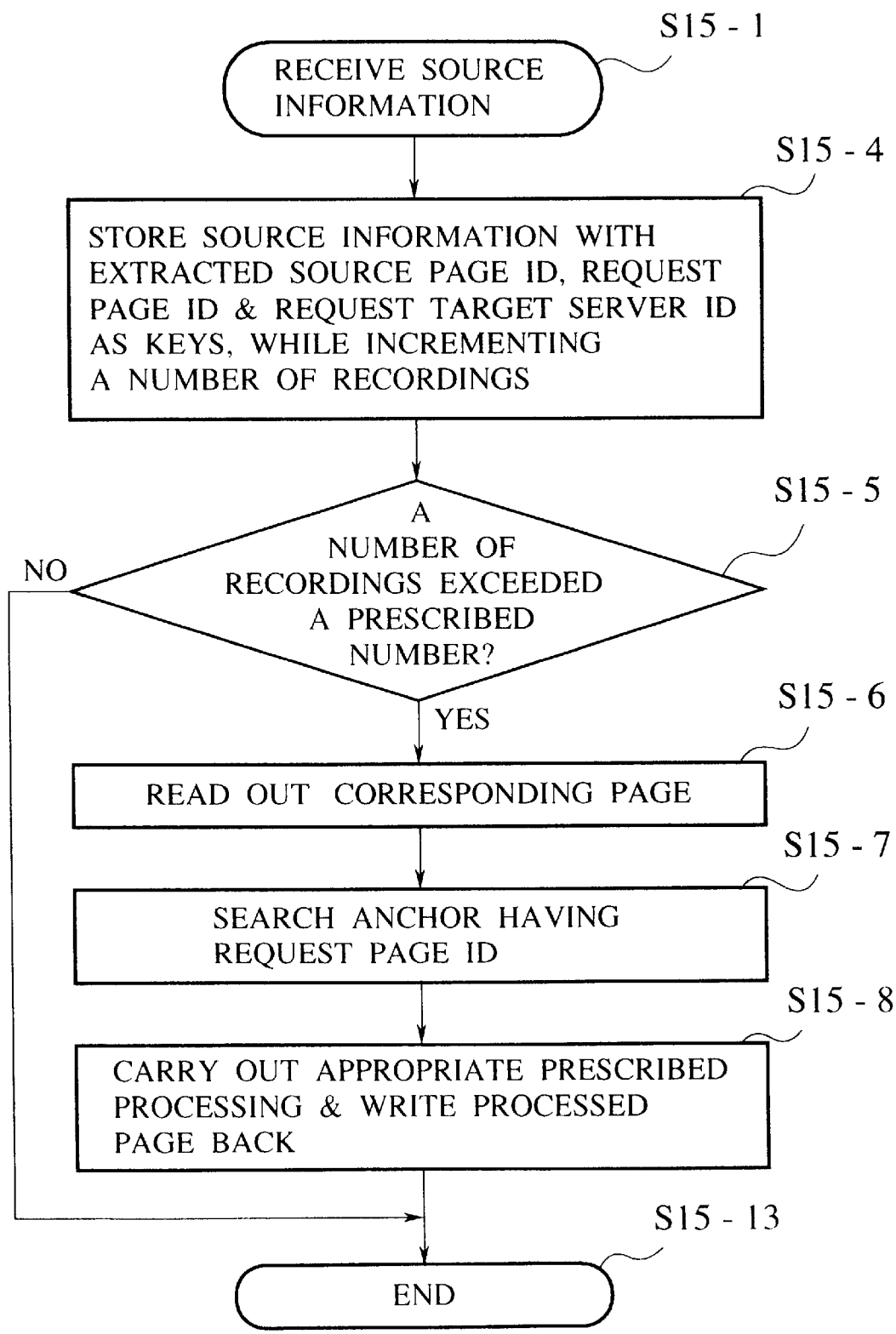
FIG. 12 is a flow chart of a processing carried out by the server device of FIG. 11.

Referring now to FIG. 11 and FIG. 12, the third embodiment regarding a server device according to the present invention will be described in detail.

A server device of this third embodiment is adapted to be capable of carrying out a prescribed processing according to a number of references made by using each anchor, when an information indicating an occurrence of a reference made by using an anchor within a page stored in this server device is provided, as in a case of using the client device of the first or second embodiment described above, or in a case of using a relay server device to be described in the fifth to seventh embodiments below.

FIG. 11 shows a configuration of a server device in this third embodiment.

This server device 4-10 has: a reception unit 4-1 for receiving a page request (request message); a page memory unit 4-2 for storing hypermedia documents; a request processing unit 4-3 for reading out a necessary page from the page memory unit 4-2 according to a received page request; a transmission unit 4-4 for transmitting a read out page to a request source; a source information reception unit 4-5 for receiving from a client 4-11 the source information message which contains an identifier of this server device 4-10 as its destination, an identifier of a page (source page) which is read out from this server device 4-10 and in which the anchor is used to make a reference, an identifier of a request page which is requested by utilizing a description within that source page, and an identifier of a server (request target server) which stores that request page as its contents; a source information memory unit 4-6 for storing the received source information (from which the identifier of this server device 4-10 may be removed); a processing determination unit 4-7 for determining an execution of a prescribed processing according to the received source information and the stored source information; and an anchor detection/change unit 4-8 for detecting an anchor specified by the source information from a page and entering a prescribed change into the detected anchor.

The processing determination unit 4-7 stores the source information into the source information memory unit 4-6 and refers to the stored source information according to the need, in order to check whether the source information concerning the same anchor was received in past, and if so, how many times it was received. According to this check result, an execution of a prescribed processing is determined, and the anchor detection/change unit 4-8 is controlled to execute the determined processing. For example, a number of times for which the source information was received (or a number of times for which the source information was received during the latest prescribed period of time) is compared with an activation condition of each processing, and the execution of the processing for which the activation condition is satisfied is determined accordingly.

Note that when the received source information message contains an information on a number of references, this information is also taken into account in determining the execution of the processing.

The anchor detection/change unit 4-8 receives a command to execute the processing from the processing determination unit 4-7, while receiving the source information. The anchor detection/change unit 4-8 then identifies a source page by using this source information, and reads out this source page from the page memory unit 4-2. Then, after an anchor used in making a reference is identified and an anchor position in the source page is detected by using the source information, a prescribed processing such as a processing to delete a link, a processing to emphasize a display, etc. is carried out. The processed page is then written back to the page memory unit 4-2.

FIG. 12 shows a flow chart of a processing concerning the source information message which is carried out in the server device of this third embodiment.

When the source information message is received (step S15-1), the source page identifier, the request page identifier, and the identifier of a server which stores the request page (request target server identifier) are extracted from the source information, and the source information is stored by using these extracted identifiers as keys, while a number of recordings is incremented by one every time the source information is received (step S15-4). Then, whether the number of recordings exceeded a prescribed number or not is judged (step S15-5).

When the number of recordings exceeded a prescribed number (step S15-5 YES), the corresponding page is read out from the page memory unit 4-2 (step S15-6), and the anchor which has an identifier of the request page is searched in the corresponding page (step S15-7). Then, an appropriate prescribed processing such as that for entering a change to give an emphasized display attribute to this anchor is carried out, and the processed corresponding page is written back to the page memory unit 4-2 (step S15-8).

Here, as the prescribed processing, any of the following can be used, for example.

(1) For an anchor for which a number of references exceeds a prescribed value C1, a change to give emphasized display attribute to this anchor is entered.

By means of this processing, at a time of displaying this anchor at the client device 4-11, this anchor is displayed with an emphasis such as a color different from that of the other anchors. Consequently, a user can recognize which anchor has a large number of references from a display of a page, and this can provide a useful information for a user in selecting an anchor.

It is also possible to provide the emphasized display attribute to be given to the anchor in several levels according to the number of references.

(2) For an anchor for which a number of references exceeds a prescribed value C1 but a number of references during the latest prescribed period of time does not exceed another prescribed value C2, the emphasized display attribute given to this anchor is deleted, or a level of the emphasized display attribute given to this anchor is lowered.

(3) For an anchor for which a number of references during the latest prescribed period of time is smaller than a prescribed value C3 (among those anchors which have been existing since the beginning of the latest prescribed period of time), this anchor is deleted.

Note that the processing is activated upon receiving the source information message in the above description, but it is also possible to provide a timer in the processing determination unit 4-7 so that the source information memory unit 4-6 is referred in order to execute the prescribed processing regularly by using this timer.

For example, by referring to the source information memory unit 4-6 regularly, an anchor with an access frequency which is null or lower than a prescribed value is detected, and the detected anchor is deleted from the page. To this end, either a list of correspondence between the pages and anchors stored in the page memory unit 4-2 is provided in the anchor detection/change unit 4-8, or the anchor detection/change unit 4-8 is operated to scan through all the pages whenever a command is received from the processing determination unit 4-7. By means of this processing, it becomes possible to automatically delete a link with a low access frequency, so that a cost required for the link management can be reduced.

The server device of this third embodiment is to be provided in advance with desired one or more of various types of the prescribed processing described above.

Figure 13:
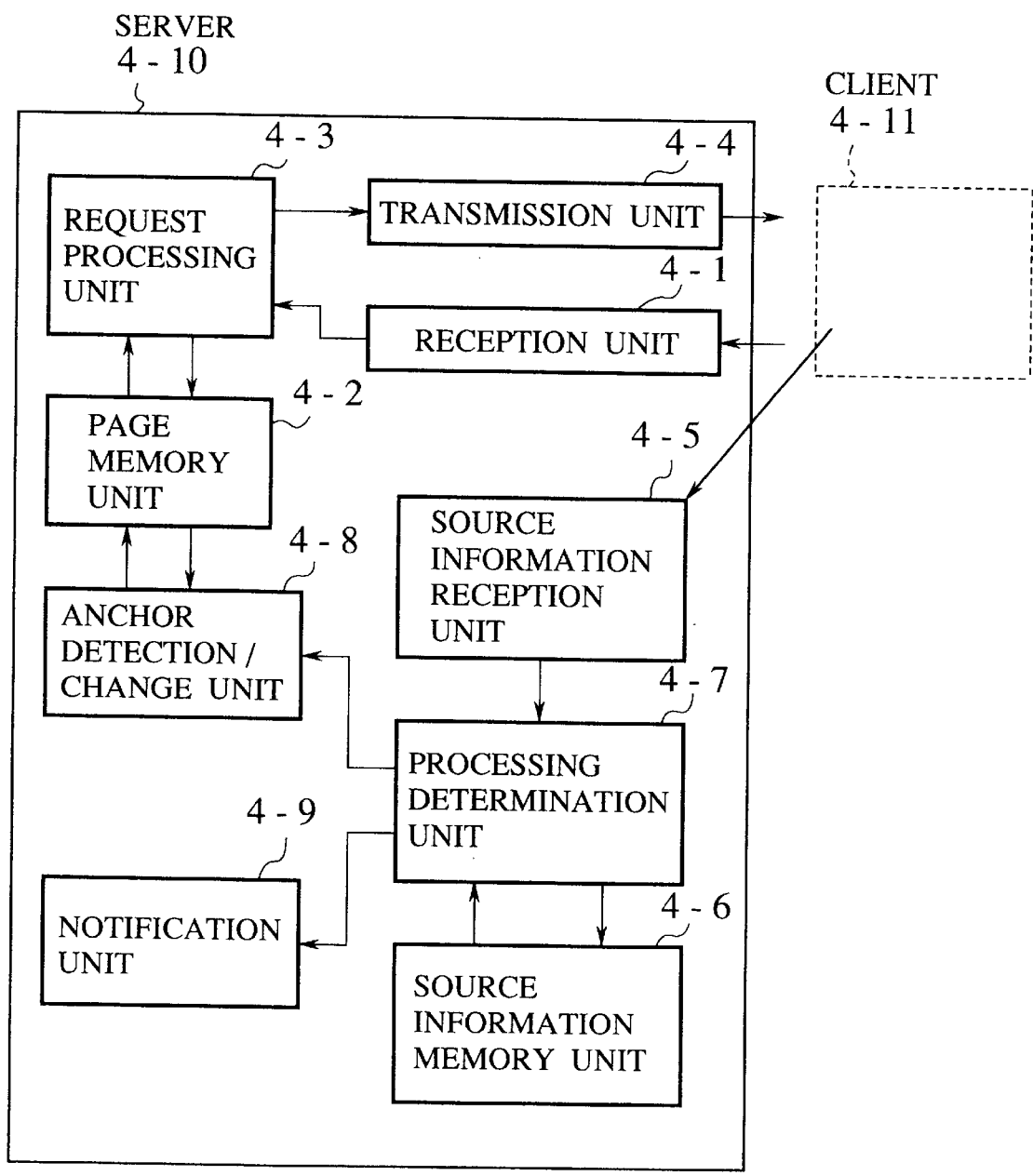
FIG. 13 is a block diagram of a server device in the fourth embodiment of the present invention.
Figure 14:
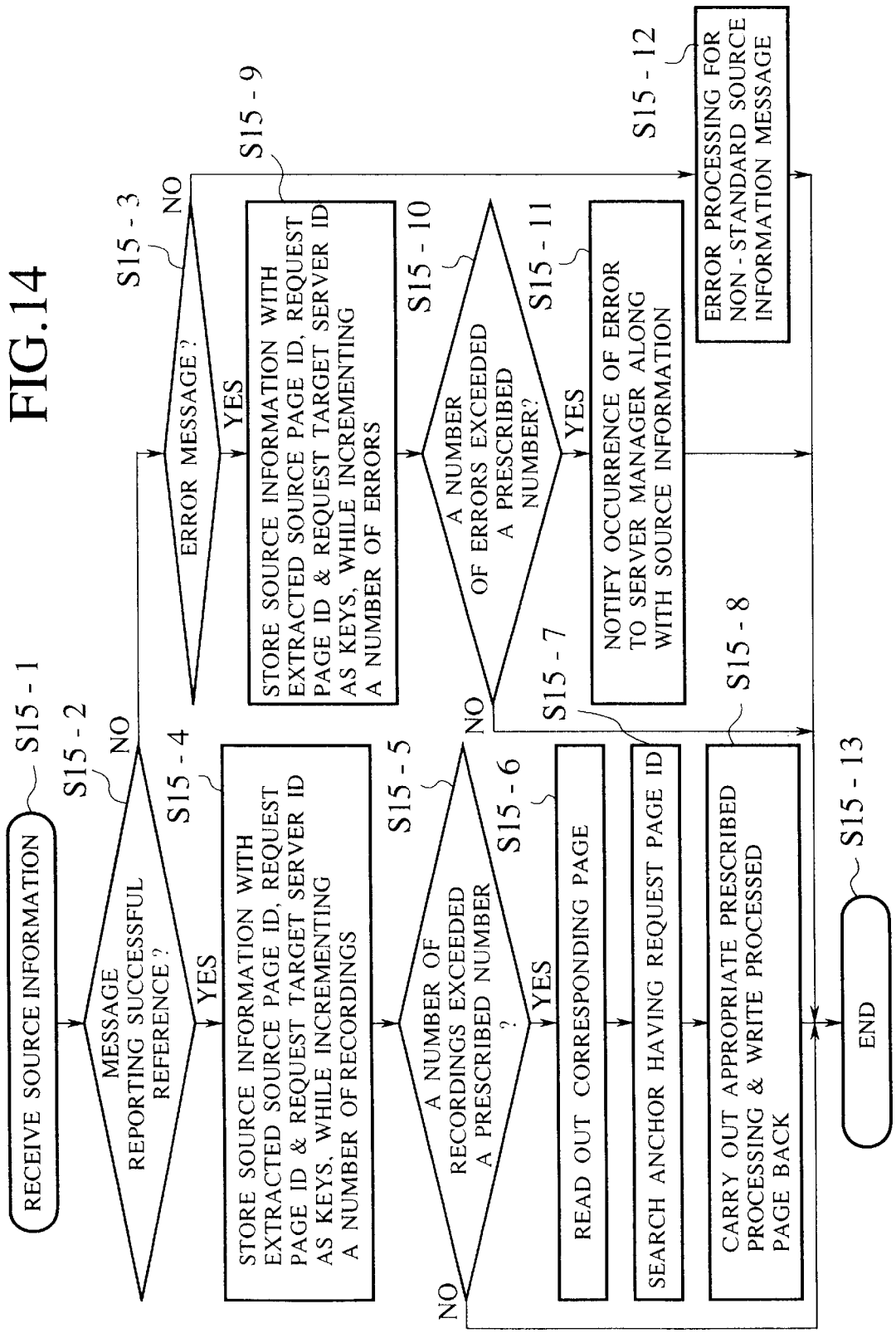
FIG. 14 is a flow chart of a processing carried out by the server device of FIG. 13.

Referring now to FIG. 13 and FIG. 14, the fourth embodiment regarding a server device according to the present invention will be described in detail.

A server device of this fourth embodiment is adapted to be capable of carrying out a prescribed processing according to a number of references made by using each anchor and the receiving result, when an information indicating an occurrence of a reference made by using an anchor within a page stored in this server device, and the receiving result of a page requested by that anchor, that is, an information as to whether the request page linked by that anchor is acquired or an error link occurred, are provided, as in a case of using the client device of the second embodiment described above.

FIG. 13 shows a configuration of a server device in this fourth embodiment.

This server device 4-10 has: a reception unit 4-1 for receiving a page request (request message); a page memory unit 4-2 for storing hypermedia documents; a request processing unit 4-3 for reading out a necessary page from the page memory unit 4-2 according to a received page request; a transmission unit 4-4 for transmitting a read out page to a request source; a source information reception unit 4-5 for receiving from a client 4-11 the source information message which contains an identifier of this server device 4-10 as its destination, an identifier of a page (source page) which is read out from this server device 4-10 and in which the anchor is used to make a reference, an identifier of a request page which is requested by utilizing a description within that source page, an identifier of a server (request target server) which stores that request page, and an information indicating the receiving result of the request page, as its contents; a source information memory unit 4-6 for storing the received source information (from which the identifier of this server device 4-10 may be removed); a processing determination unit 4-7 for determining an execution of a prescribed processing according to the received source information and the stored source information; an anchor detection/change unit 4-8 for detecting an anchor specified by the source information from a page and entering a prescribed change into the detected anchor according to a command from the processing determination unit 4-7; and a notification unit 4-9 for sending a notice concerning the received source information to a server manager according to a command from the processing determination unit 4-7.

The processing determination unit 4-7 stores the source information for each receiving result separately into the source information memory unit 4-6 and refers to the stored source information according to the need, in order to check whether the source information concerning the same anchor was received in past, and if so, how many times it was received, According to this check result, an execution of a prescribed processing is determined, and the anchor detection/change unit 4-8 or the notification unit 4-9 is controlled to execute the determined processing. For example, a number of times for which the source information was received (or a number of times for which the source information was received during the latest prescribed period of time) is compared with an activation condition of each processing, and the execution of the processing for which the activation condition is satisfied is determined accordingly.

Note that when the received source information message contains an information on a number of references, this information is also taken into account in determining the execution of the processing.

The anchor detection/change unit 4-8 receives a command to execute the processing from the processing determination unit 4-7, while receiving the source information. The anchor detection/change unit 4-8 then identifies a source page by using this source information, and reads out this source page from the page memory unit 4-2. Then, after an anchor used in making a reference is identified and an anchor position in the source page is detected by using the source information, a prescribed processing such as a processing to delete a link, a processing to emphasize a display, etc. is carried out. The processed page is then written back to the page memory unit 4-2.

The notification unit 4-9 sends a notice concerning the received source information to the server manager. For example, a notice indicating an occurrence of a link error in a certain link is sent.

As for a method of sending a notice, it is possible to use a method for sending an electronic mail to the server manager, a method for displaying a message text on a display device of this server device, or a method for outputting a journal, for example.

In contrast to the above described anchor detection/change unit 4-8 which is used for a relatively simple processing of a standard type, this notification unit 4-9 is used when it is intended to induce a sophisticated processing which involves an interaction of a manager, such as that for handling a case in which a link error occurs frequently, by judging a cause of an error as a trouble in the network, a change of a link target page, or an erroneous description in the anchor.

FIG. 14 shows a flow chart of a processing concerning the source information message which is carried out in the server device of this fourth embodiment.

When the source information message is received (step S15-1), whether it is a message reporting a successful reference or not is judged (step S15-2) and whether it is an error message reporting a failure of a reference or not is judged (step S15-3).

When the received message is a message reporting a successful reference (step S15-2 YES), the source page identifier, the request page identifier, and the identifier of a server which stores the request page (request target server identifier) are extracted from the source information, and the source information is stored by using these extracted identifiers as keys, while a number of recordings is incremented by one every time a message reporting a successful reference is received (step S15-4). Then, whether the number of recordings exceeded a prescribed number or not is judged (step S15-5).

When the number of recordings exceeded a prescribed number (step S15-5 YES), the corresponding page is read out from the page memory unit 4-2 (step S15-6), and the anchor which has an identifier of the request page is searched in the corresponding page (step S15-7). Then, an appropriate prescribed processing such as that for entering a change to give an emphasized display attribute to this anchor is carried out, and the processed corresponding page is written back to the page memory unit 4-2 (step S15-8).

On the other hand, when the received message is an error message (step S15-3 YES), the source page identifier, the request page identifier, and the identifier of a server which stores the request page (request target server identifier) are extracted from the source information, and the source information is stored by using these extracted identifiers as keys, while a number of errors is incremented by one every time the error message is received (step S15-9). Then, whether the number of errors exceeded a prescribed number or not is judged (step S15-10).

When the number of errors exceeded a prescribed number (step S15-10 YES), a notice indicating an occurrence of an error is sent to the server manager along with the source information (information on the source page and the request page) (step S15-11).

When the received message is neither a message reporting a successful reference not an error message (step S15-2 NO and step S15-3 NO), it is judged as a non-standard source information message, and a prescribed error processing for a non-standard source information message is carried out (step S15-12).

Here, as the prescribed processing, any of the following can be used, for example.

(1) For an anchor for which a number of references exceeds a prescribed value C1, a change to give an emphasized display attribute to this anchor is entered.

By means of this processing, at a time of displaying this anchor at the client device 4-11, this anchor is displayed with an emphasis such as a color different from that of the other anchors. Consequently, a user can recognize which anchor has a large number of references from a display of a page, and this can provide a useful information for a user in selecting an anchor.

It is also possible to provide the emphasized display attribute to be given to the anchor in several levels according to the number of references.

(2) For an anchor for which a number of references exceeds a prescribed value C1 but a number of references during the latest prescribed period of time does not exceed another prescribed value C2, the emphasized display attribute given to this anchor is deleted, or a level of the emphasized display attribute given to this anchor is lowered.

(3) For an anchor for which a number of references during the latest prescribed period of time is smaller than a prescribed value C3 (among those anchors which have been existing since the beginning of the latest prescribed period of time), or an anchor for which a number of errors exceeds another prescribed value regardless of a number of references, this anchor is deleted.

(4) For an anchor for which a number of errors exceeds a prescribed value C4, a notice is sent to the server manager by the notification unit 4-9.

(5) For an anchor for which a number of errors exceeds a prescribed number C5 and a number of references during the latest prescribed period of time is smaller than another prescribed value C6, this anchor is automatically deleted by the anchor detection/change unit 4-8, while for an anchor for which a number of errors exceeds a prescribed number C5 and a number of references during the latest prescribed period of time exceeds another prescribed value C7, a notice is sent to the server manager by the notification unit 4-9.

Note that the processing is activated upon receiving the source information message in the above description, but it is also possible to provide a timer in the processing determination unit 4-7 so that the source information memory unit 4-6 is referred in order to execute the prescribed processing regularly by using this timer.

For example, by referring to the source information memory unit 4-6 regularly, an anchor with an access frequency which is null or lower than a prescribed value is detected, and the detected anchor is deleted from the page. To this end, either a list of correspondence between the pages and anchors stored in the page memory unit 4-2 is provided in the anchor detection/change unit 4-8, or the anchor detection/change unit 4-8 is operated to scan through all the pages whenever a command is received from the processing determination unit 4-7. By means of this processing, it becomes possible to automatically delete a link with a low access frequency, so that a cost required for the link management can be reduced.

The server device of this third embodiment is to be provided in advance with desired one or more of various types of the prescribed processing described above.

It is also possible to modify the server device of this fourth embodiment by omitting the notification unit 4-9 in the configuration of FIG. 13, if desired.

It is also possible to modify the server device of this fourth embodiment by omitting the anchor detection/change unit 4-8 in the configuration of FIG. 13, if desired.

Note that when the client provides the information indicating the error content of the error link, that is, the information indicating a cause of the error as the congestion in the network, the non-existence of a link target page, etc., it is possible for the server to carry out the processing according to the error content of the error link.

Now, a system construction in a form of a software program for this fourth embodiment will be described.

The source information reception unit 4-5 of FIG. 13 can be provided in a form of a program describing a function of the step S15-1 of FIG. 14, while the processing determination unit 4-7 of FIG. 13 can be provided in a form of a program describing functions of the steps S15-2, S15-5, S15-3 and S15-10 of FIG. 14. Also, the source information memory unit 4-6 of FIG. 13 can be provided in a form of a program describing functions of the steps S15-4 and S15-9 of FIG. 14, while the anchor detection/change unit 4-8 of FIG. 13 can be provided in a form of a program describing functions of the steps S15-6, S15-7 and S15-8 of FIG. 14, and the notification unit 4-9 of FIG. 13 can be provided in a form of a program describing a function of the step S15-11 of FIG. 14. In addition, the step S15-12 of FIG. 14 is realized as an error processing routine at a time of receiving a non-standard source information message. These programs can be stored in a recording medium. Then, this recording medium can be installed into a computer machine having a function to communicate with clients and a function for storing pages, and executed at a timing of a source information message reception.

Figure 15:
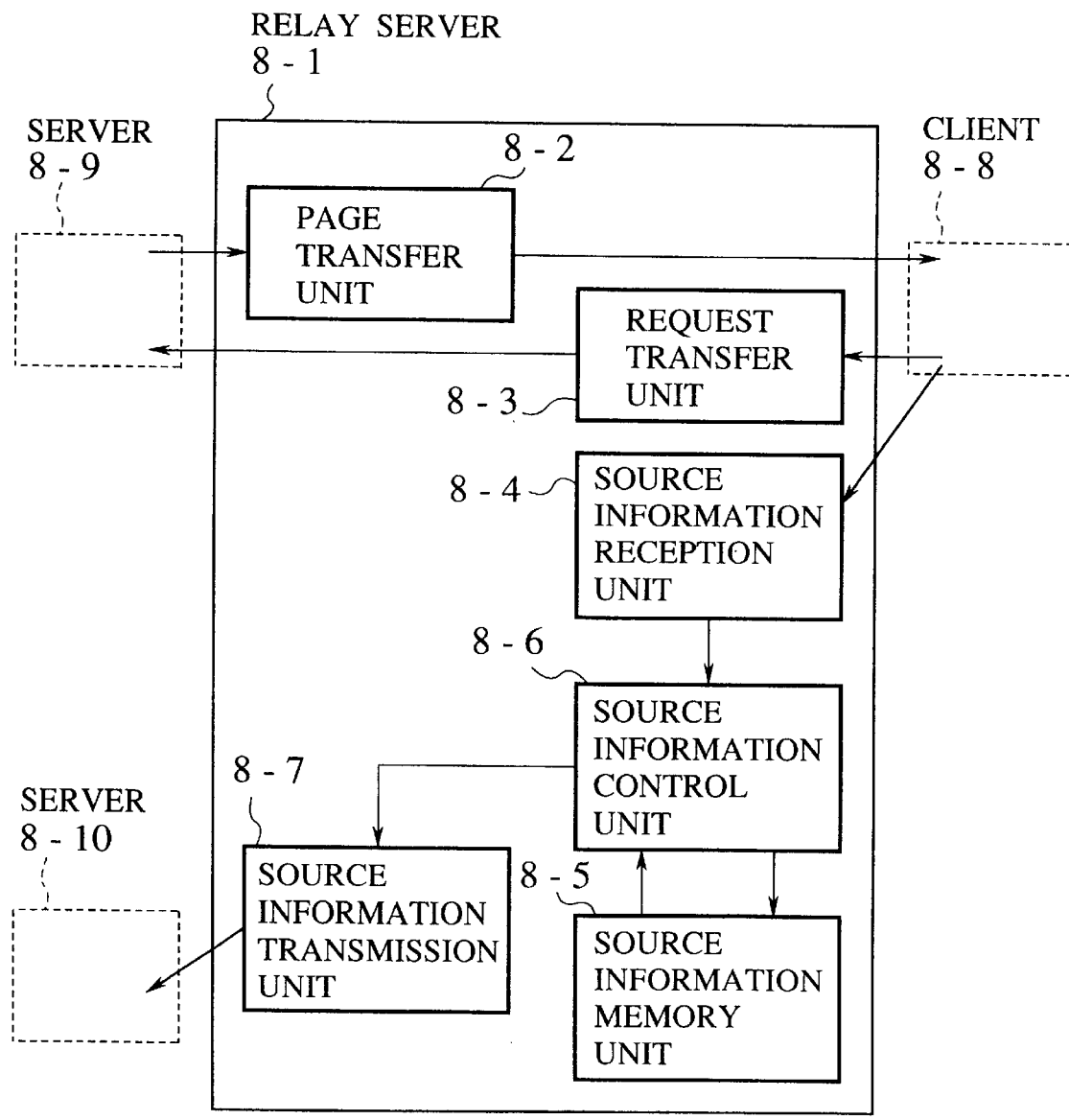
FIG. 15 is a block diagram of a relay server device in the fifth embodiment of the present invention.
Figure 16:
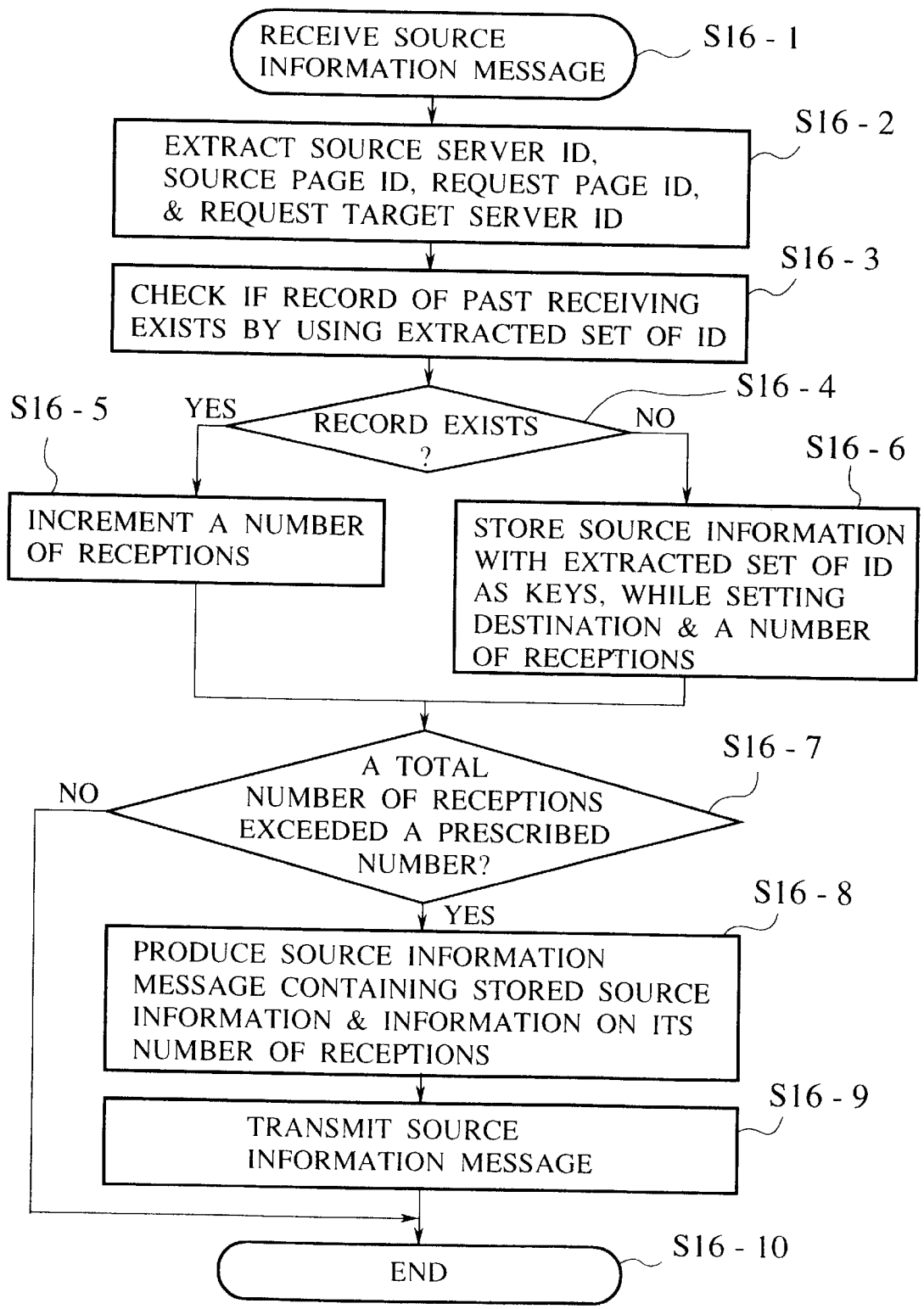
FIG. 16 is a flow chart of a processing carried out by the relay server device of FIG. 15.

Referring now to FIG. 15 and FIG. 16, the fifth embodiment regarding a relay server device according to the present invention will be described in detail.

FIG. 15 shows a configuration of a relay server device in this fifth embodiment.

The relay server 8-1 is a device which functions to transfer pages and requests by being located between the server devices 8-9 and 8-10 which store and provide the hypermedia documents and a client device 8-8 which acquires and displays the hypermedia documents.

This relay server 8-1 has: a page transfer unit 8-2 for transferring a page from the server 8-9 to the client 8-8; a request transfer unit 8-3 for transferring a request from the client 8-8 to the server 8-9; a source information reception unit 8-4 for receiving the source information from the client 8-8; a source information memory unit 8-5 for storing the received source information; a source information control unit 8-6 for determining a handling of the source information; and a source information transmission unit 8-7 for transmitting the source information message to the server 8-10.

The source information control unit 8-6 receives the source information from the source information reception unit 8-4, commands the storing of the source information into the source information memory unit 8-5, increases a number of receptions for each source information which is recorded in the source information memory unit 8-5, judges whether a number of receptions exceeded a prescribed value, and when a number of receptions exceeded a prescribed value, produces the source information message and commands the source information transmission unit 8-7 to transmit the produced source information message.

Note that the client 8-8 which transmits the source information message to be received by the source information reception unit 8-4 is a client device which has a function for transmitting the source information independently such as that of the first embodiment described above.

FIG. 16 shows a flow chart of a processing concerning the source information message which is carried out in the relay server device of this fifth embodiment.

When the source information message is received at the relay server 8-1 (step S16-1), the source server identifier, the source page identifier, the request page identifier, and the identifier of a server which stores the request page (request target server identifier) are extracted from the received source information message (step S16-2), and whether there exists a record of a past receiving of the source information which has the same set of identifiers as the extracted identifiers or not is judged (step S16-3).

When a record of a past receiving exists (step S16-4 YES), a number of receptions for this source information is incremented by one (step S16-5), whereas when a record of a past receiving does not exist (step S16-4 NO), the received source information is stored by using the extracted source server identifier, source page identifier, request page identifier, and request target server identifier as keys, while a destination is set to the source server identified by the extracted source server identifier and a number of receptions is set to 1 (step S16-6).

Next, whether a total number of receptions for all the stored source information exceeded a prescribed number or not is judged (step S16-7). When the total number of receptions exceeded a prescribed number (step S16-7 YES), the source information message containing the stored source information and an information on its number of receptions is produced (step S16-8), and this source information message is transmitted to its destination (step S16-9). When the total number of receptions does not exceed a prescribed number (step S16-7 NO), the source information is not transferred.

In this manner, it is possible to realize a processing in which a number of source information is counted at the relay server 8-1, and a number of receptions of each source information is attached to the source information message and transmitted to the source server.

Note that, in the above processing, when an information on a number of references is attached to the received source information message, a number of receptions is counted by taking this information into account.

Also, in the above processing, when a variable information which changes in time such as a time at which the anchor is selected is attached to the received source information message, it is preferable to separately store the variable information at a time of counting the number of receptions, and attach the stored variable information to the source information messages at a time of transmitting the source information messages, just as in the second modification of the first embodiment described above. In such a case, it is also possible to use any of (1) a method to control a transmission link by link as described above, (2) a method to control a transmission source page by source page, and (3) a method to control a transmission server by server.

Also, in the above processing, the source information message is transferred by attaching the number of receptions (number of references), but it is also possible to store each source information message and transmit the stored source information altogether when a number of recordings exceeded a prescribed value. Just as in the second modification of the first embodiment described above.

Now, a system construction in a form of a software program for this fifth embodiment will be described.

The source information reception unit 8-4 of FIG. 15 can be provided in a form of a program describing a function of the step S16-1 of FIG. 16, while the source information memory unit 8-5 of FIG. 15 can be provided in a form of a program describing functions of the steps S16-3, S16-5, S16-6 and S16-8 of FIG. 16. Also, the source information control unit 8-6 of FIG. 15 can be provided in a form of a program describing Judging processing and calculation processing functions of the steps S16-2, S16-3, S16-4, S16-5, S16-6, S16-7, and S16-8 of FIG. 16, while the source information transmission unit 8-7 of FIG. 15 can be provided in a form of a program describing a function of the step S16-9 of FIG. 16. These programs can be stored in a recording medium. Then, this recording medium can be installed into a computer machine which is located in a middle of the client and the server and having functions to intermediate the request transfer and the page transfer, and executed at a timing of a source information message reception.

Figure 17:
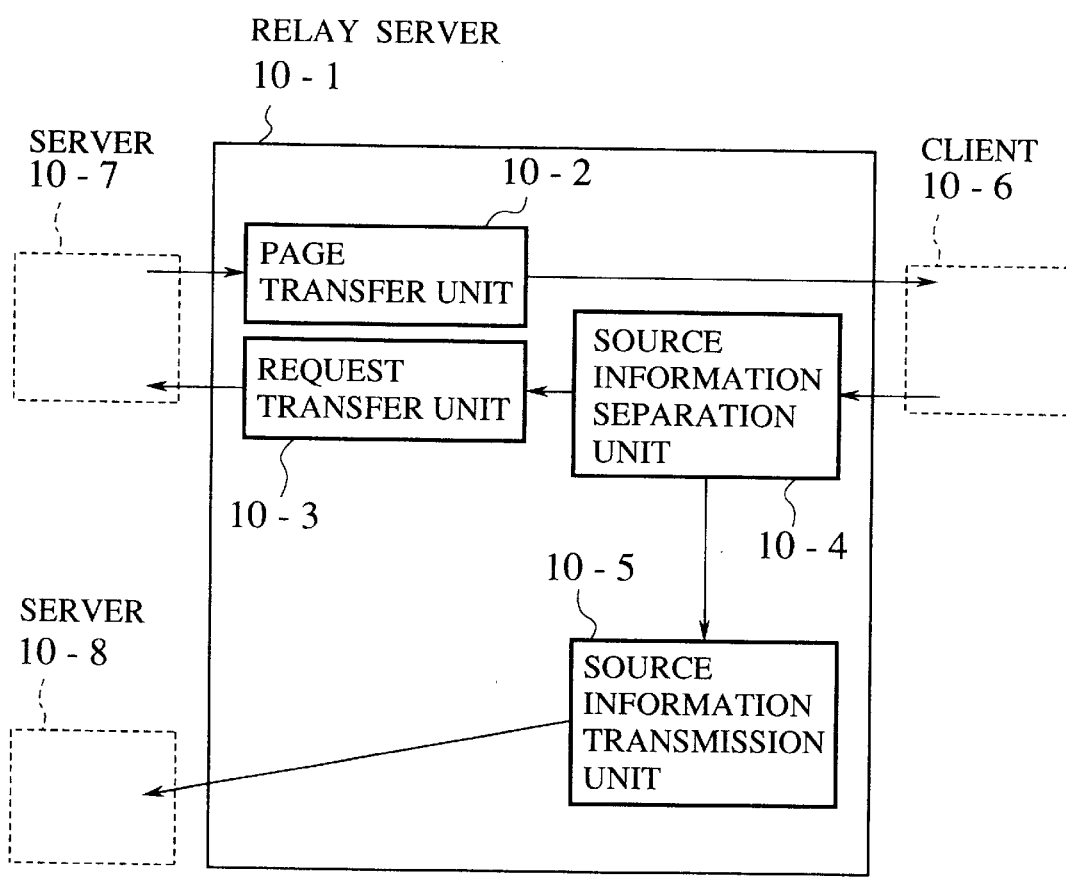
FIG. 17 is a block diagram of a relay server device in the sixth embodiment of the present invention.
Figure 18:
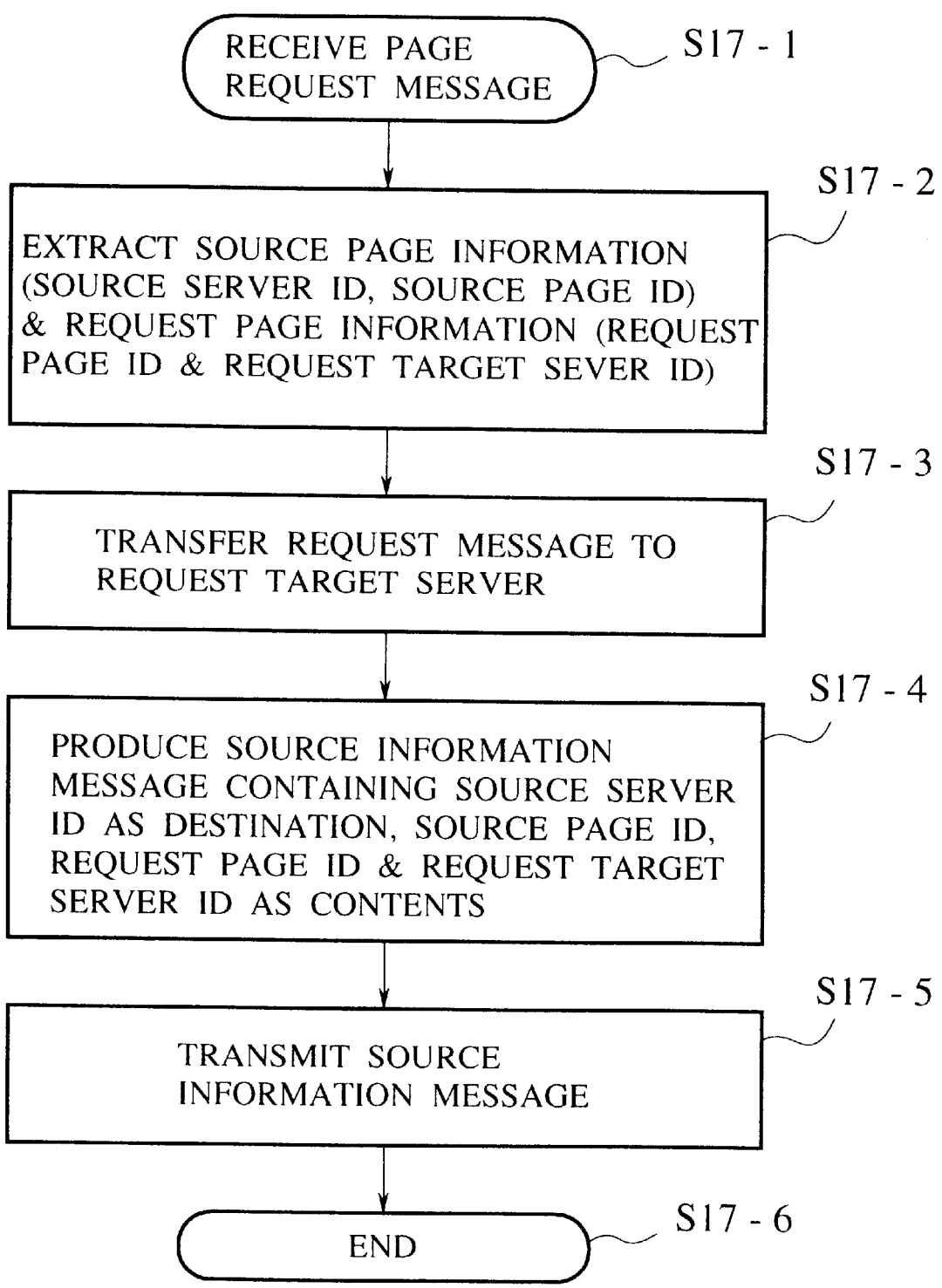
FIG. 18 is a flow chart of a processing carried out by the relay server device of FIG. 17.

Referring now to FIG. 17 and FIG. 18, the sixth embodiment regarding a relay server device according to the present invention will be described in detail.

FIG. 17 shows a configuration of a relay server device in this sixth embodiment.

The relay server 10-1 is a device which functions to transfer pages and requests by being located between the server devices 10-7 and 10-8 which store and provide the hypermedia documents and a client device 10-6 which acquires and displays the hypermedia documents.

This relay server 10-1 has: a page transfer unit 10-2 for transferring a page from the server 10-7 to the client 10-6; a request transfer unit 10-3 for transferring a request from the client 10-6 to the server 10-7; a source information separation unit 10-4 for separating the source information of the present invention from the request message, and a source information transmission unit 10-5 for transmitting the source information message to the server 10-8.

The source information separation unit 10-4 receives the request message from the client 10-6 which has a function to transmit the request message by attaching the conventional source information (that is, the source page information of the present invention) as in a case of FIG. 2 described above. The source information separation unit 10-4 then separates the source information of the present invention from the received request message, and gives the page request information to the request transfer unit 10-3 while giving the separated source information of the present invention to the source information transmission unit 10-5.

FIG. 18 shows a flow chart of a processing concerning the source information message which is carried out in the relay server device of this sixth embodiment.

When the page request message is received at the relay server 10-1 (step S17-1), the source page information (the source server identifier, the source page identifier) and the request page information (the request page identifier, the identifier of a server which stores the request page (request target server identifier)) are extracted from the received request message (step S17-2), while the received request message as a whole or only an information necessary in requesting a page in the received request message is transmitted as a request message to the request target server from the request transfer unit 10-3 (step S17-3).

Then, the source information message which contains the extracted source server identifier as its destination and the extracted source page identifier, request page identifier and request target server identifier as its contents is produced (step S17-4), and transmitted to the source server (step S17-5).

In this manner, it is possible to realize a processing in which the source information of the present invention is separated from the request message at the relay server and transmitted to the source server.

It is also possible to modify this sixth embodiment in various manners in order to carry out the actual transmission only when a prescribed number of source information messages are to be transmitted, by using the methods similar to those used in the fifth embodiment described above.

Now, a system construction in a form of a software program for this sixth embodiment will be described.

The source information separation unit 10-4 of FIG. 17 can be provided in a form of a program describing functions of the steps S17-1, S17-2 and S17-4 of FIG. 18, while the request transfer unit 10-3 of FIG. 17 can be provided in a form of a program describing a function of the step S17-3 of FIG. 18. Also, the source information transmission unit 10-5 of FIG. 17 can be provided in a form of a program describing a function of the step S17-5 of FIG. 18. These programs can be stored in a recording medium. Then, this recording medium can be installed into a computer machine which is located in a middle of the client and the server and having functions to intermediate the request transfer and the page transfer, and executed at a timing of a page request message reception.

Figure 19:
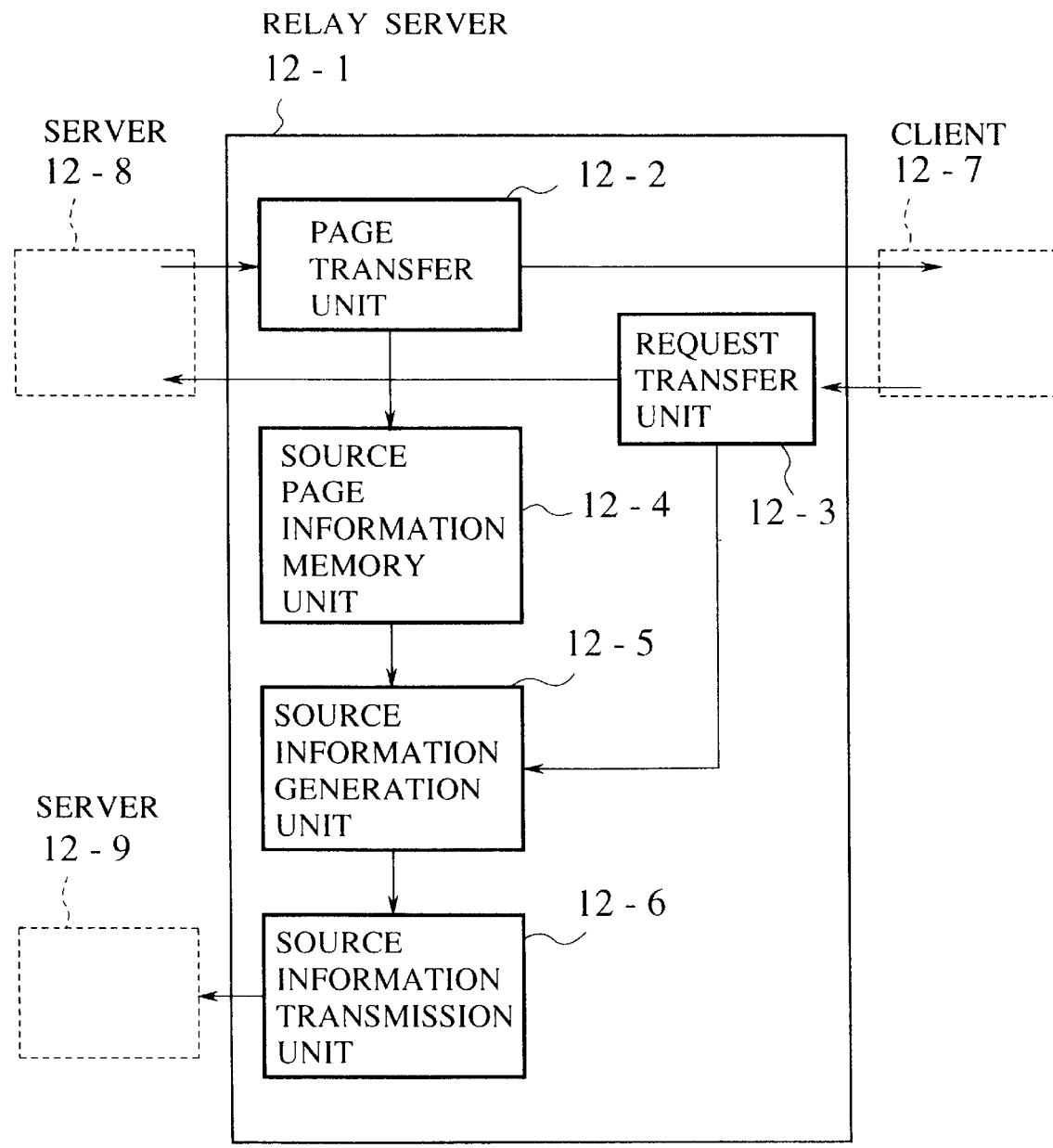
FIG. 19 is a block diagram of a relay server device in the seventh embodiment of the present invention.
Figure 20:
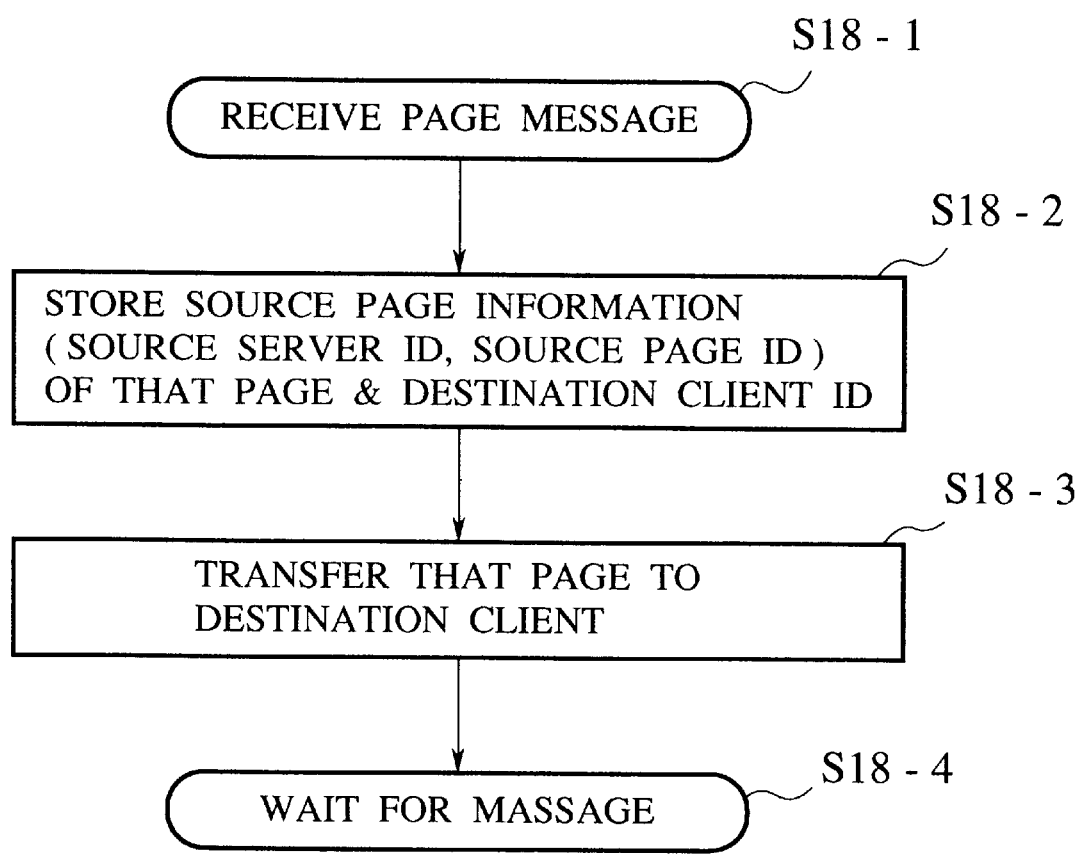
FIG. 20 is a flow chart of a processing carried out by the relay server device of FIG. 19 upon receiving a page message.
Figure 21:
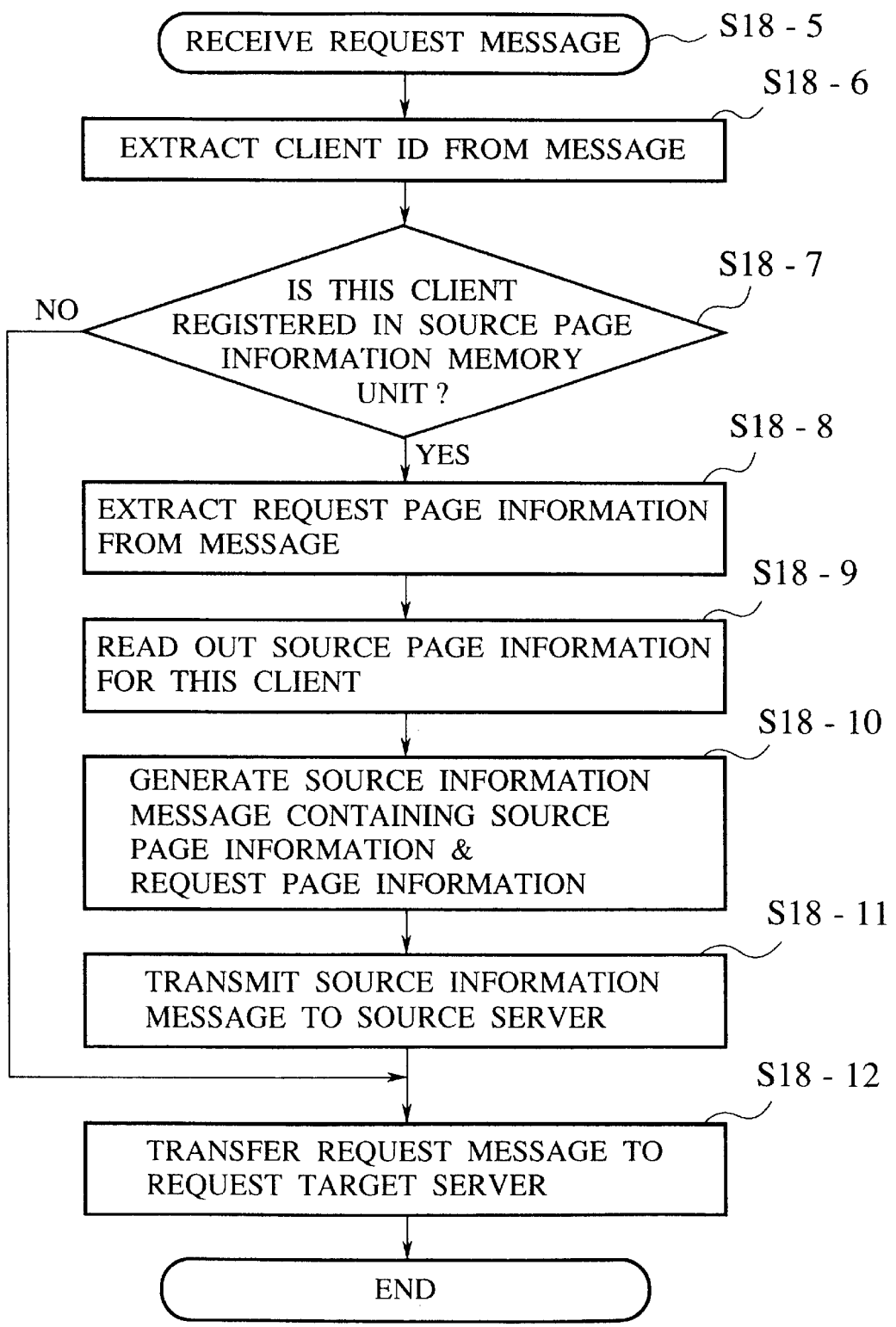
FIG. 21 is a flow chart of a processing carried out by the relay server device of FIG. 19 upon receiving a request message.

Referring now to FIG. 19 to FIG. 21, the seventh embodiment regarding a relay server device according to the present invention will be described in detail.

FIG. 19 shows a configuration of a relay server device in this seventh embodiment.

The relay server 12-1 is a device which functions to transfer pages and requests by being located between the server devices 12-8 and 12-9 which store and provide the hypermedia documents and a client device 12-7 which acquires and displays the hypermedia documents.

This relay server 12-1 has: a page transfer unit 12-2 for transferring a page from the server 12-8 to the client 12-7; a request transfer unit 12-3 for transferring a request from the client 12-7 to the server 12-8; a source page information memory unit 12-4 for storing the source page information, a source information generation unit 12-5 for generating the source information message, and a source information transmission unit 12-6 for transmitting the source information message to the server 12-9 according to an information obtained from the source page information.

When a page is transferred from the server 12-8 to the client 12-7, the source page information memory unit 12-4 obtains the source page information containing an identifier (source server identifier) of the server 12-8 which transmitted this page, and an identifier (source page identifier) of that page to be transferred, and stores this source page information, while attaching to this source page information an identifier of the client 12-7 which is a transfer target of this page.

On the other hand, when a page request is transferred from the client 12-7 to the server 12-8, the source information generation unit 12-5 reads out the corresponding source page information from the source page information memory unit 12-4 by using the identifier of the client 12-7 which issued this page request as a key, and generates the source information message. Note that, in FIG. 19, an arrow from the page transfer unit 12-2 of the relay server 12-1 to the transfer target client 12-7 indicates a page transfer which takes place as a result of a page request transferred from the request transfer unit 12-3 to the server 12-8, and a page transfer which causes the storing of the corresponding source page information at the source information page memory unit 12-4 is an immediately previous page transfer (for currently displayed page).

Here, the client 12-7 which issues the message to be received at the request transfer unit 12-3 is a client device which does not have a function to transmit the source information.

FIG. 20 and FIG. 21 show flow charts of processing which are carried out in the relay server device of this seventh embodiment, where FIG. 20 shows a processing at a time of a page transfer and FIG. 21 shows a processing at a time of a page request transfer. The processing of FIG. 20 records an information on the source server identifier and the source page identifier at a time of transferring a currently displayed page, while the processing of FIG. 21 generates the source information message corresponding to a page request to be transferred at a time of transferring that page request.

In FIG. 20, when a page message for one page is received at the relay server 12-1 (step S18-1), the source page information (the source server identifier and the source page identifier for that page) is obtained and stored in the source page information memory unit 12-4 by attaching an identifier of a destination client of that page (step S18-2). Here, the source page information memory unit 12-4 stores one latest information for each client. Then, this page is transferred to the destination client by the page transfer unit 12-2 (step S18-3). The relay server 12-1 is then set in a state to wait for a next message (step S18-4).

On the other hand, in FIG. 21, when a request message requesting another page is received at the relay server 12-1 (step S18-5), an identifier of the client which issued this request is obtained (step S18-6), and whether this client is registered in the source page information memory unit 12-4 or not is Judged by searching the source page information having the same client identifier as that obtained at the step S18-6 among the information recorded at the step S18-2 (step S18-7).

When this client is registered, the request page information (an identifier of a server (request target server) which stores the request page and an identifier of the request page) is extracted from the received request message (step S18-8), while the source page information corresponding to this client which issued this request is read out from the source page information memory unit 12-4 (step S18-9). Then, the source information message containing the read out source page information and the extracted request page information as its contents is generated (step S18-10), and this source information message is transmitted to the source server identified by the source server identifier in the source information (step S18-11).

After the step S18-11 or when the client is not registered at the step S18-7, the request message received at the step S18-5 is transferred to the request target server (step S18-12).

In this manner, it is possible to realize a processing in which the source information message is generated at the relay server and transmitted to the source server.

It is also possible to modify this seventh embodiment in various manners in order to carry out the actual transmission only when a prescribed number of source information messages are to be transmitted, by using the methods similar to those used in the fifth embodiment described above.

Now, a system construction in a form of a software program for this seventh embodiment will be described.

The page transfer unit 12-2 of FIG. 19 can be provided in a form of a program describing functions of the steps S18-1 and S18-3 of FIG. 20, and the source page information memory unit 12-4 of FIG. 19 can be provided in a form of a program describing a function of the step S18-2 of FIG. 20. Also, the request transfer unit 12-3 of FIG. 19 can be provided in a form of a program describing functions of the steps S18-5 and S18-12 of FIG. 21, while the source information generation unit 12-5 of FIG. 19 can be provided in a form of a program describing functions of the steps S18-6, S18-7, S18-8, S18-9 and S18-10 of FIG. 21, and the source information transmission unit 12-6 of FIG. 19 can be provided in a form of a program describing a function of the step S18-11 of FIG. 21. These programs can be stored in a recording medium. Then, this recording medium can be installed into a computer machine which is located in a middle of the client and the server and having functions to intermediate the request transfer and the page transfer, and executed at timings of a page message reception and a page request message reception.

In the following, five concrete examples of a system in which the client device, the server device, and the relay server device of the first to seventh embodiments described above are variously combined will be described in detail. In FIG. 22, FIG. 23, FIG. 25 and FIG. 26 described below, a network is omitted in the figures, but a network is to be utilized according to the need.

EXAMPLE-1

First, a concrete example of a system using a client which can transmit the source information independently from the page request, and a server which utilizes the source information.

Figure 22:
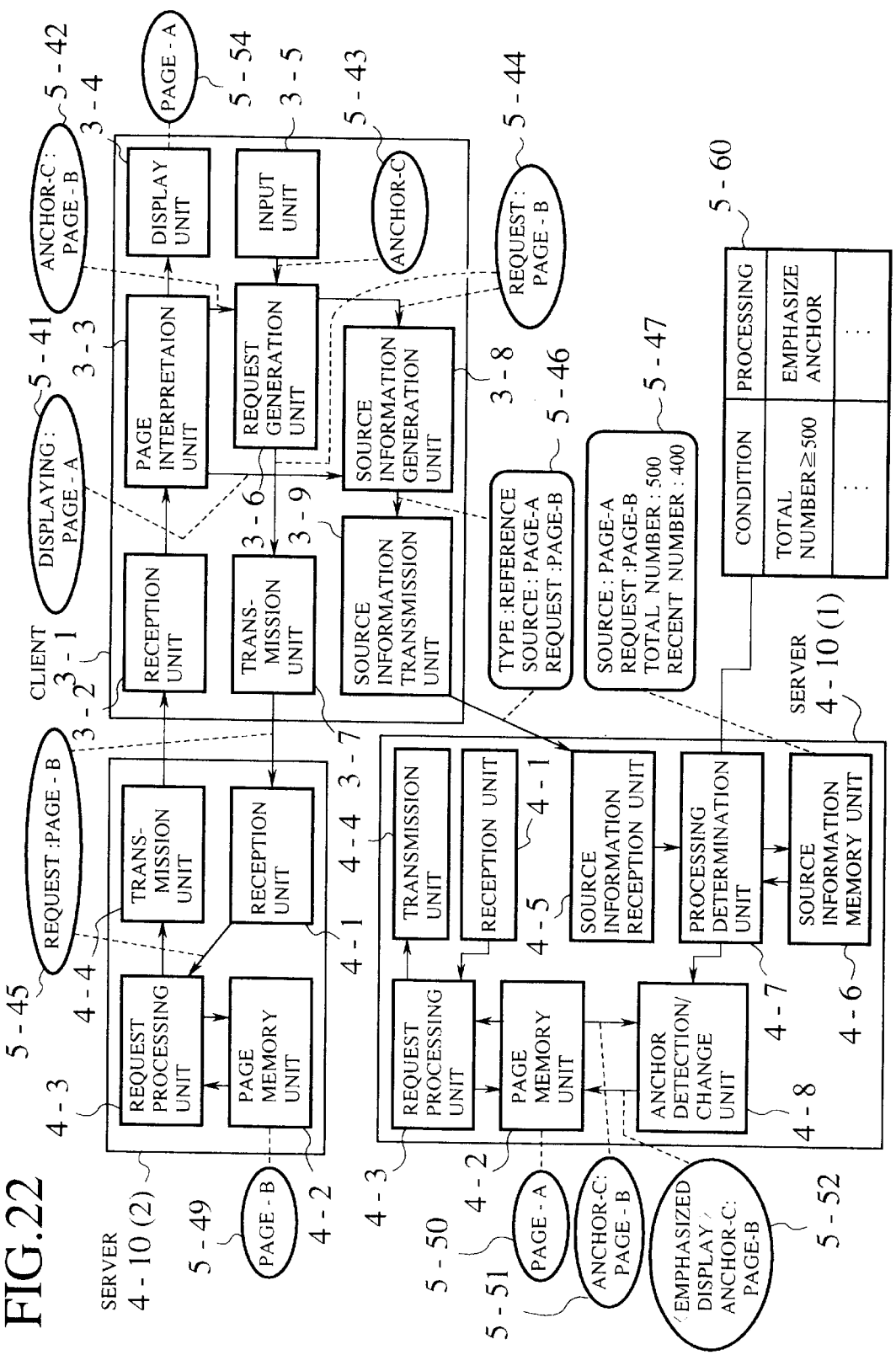
FIG. 22 is a block diagram of a first concrete example of a system according to the present invention which uses a client device and server devices.

FIG. 22 shows a system configuration in this example-1, where the client 3-1 has the same configuration as that of the first embodiment which is shown in FIG. 6 and operated according to the flow chart of FIG. 7, while the server 4-10 has the same configuration as that of the third embodiment which is shown in FIG. 11. Note however that the server 4-10 (2) is shown with only a partial internal configuration for the sake of simplicity.

Now, suppose that when the client 3-1 is currently displaying a page-A acquired from the server 4-10 (1) (5-54), a user selected an anchor-C in the page-A.

In this case, the exemplary operations in the client 3-1 are as follows. Namely, the input unit 3-5 of the client 3-1 notifies the fact that the anchor-C is selected to the request generation unit 3-6 (5-43). The request generation unit 3-6 generates a request message (5-44) requesting a page-B, according to a correspondence information (5-42) for the anchor received from the page interpretation unit 3-3 and a page, and gives this request message to the transmission unit 3-7 and the source information generation unit 3-8.

The page interpretation unit 3-3 always has an information (5-41) indicating a currently displayed page, and the source information generation unit 3-8 produces the source information (5-46) which indicates that "a page-B is referred from an anchor on a page-A", by using the currently displayed page information (5-41) and the request message (5-44) requesting the page-B. The source information (5-46) is not given to the transmission unit 3-7 so that this source information is not transmitted to the server 4-10 (2). The source information (5-46) is transmitted to the server (source server) 4-10 (2) which stores the page-A, through the source information transmission unit 3-9.

Figure 3:
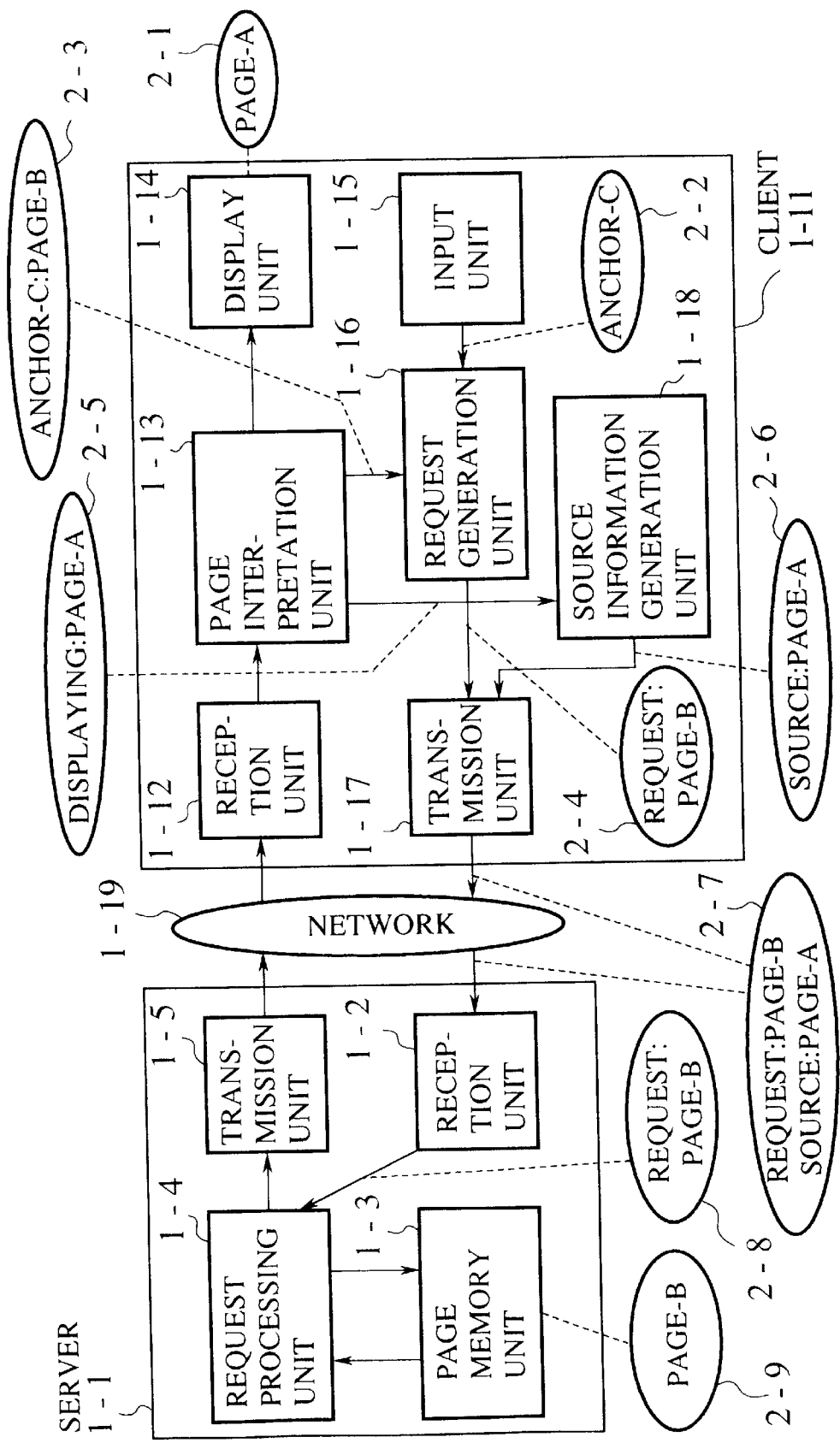
FIG. 3 is a block diagram of the conventional server-client system of FIG. 2 for explaining its operation.

On the other hand, the transmission unit 3-7 transmits the request message (5-45) requesting the page-B to the request target server 4-10 (2), and then the reception unit 3-2 receives the page-B (5-49) returned from the server 4-10 (2) in response. Here the server 4-10 (2) operates similarly as a conventional server 1-1 shown in FIG. 3, so that the operations of the server 4-10 (2) will not be described here.

Next, the exemplary operations in the server 4-10 (1) are as follows.

In the server 4-10 (1), the source information reception unit 4-5 receives the source information (5-46) from the source information transmission unit 3-9 of the client 3-1, and gives this source information to the processing determination unit 4-7.

The processing determination unit 4-7 then extracts the source page identifier (page-A) and the request page identifier (page-B) from this source information, and searches through the source information memory unit 4-6 by using these extracted identifiers as keys. As a result, data (5-47) is found, and a counter labelled as "total number" is incremented by one while a counter labelled as "recent number" which is reset at a prescribed time in order to count a number of references in a single day (after 12:00 p.m.) is also incremented by one. Here, the "total number" exceeded a prescribed number (assumed to be 500 here) so that the processing determination unit 4-7 commands the anchor detection/change unit 4-8 to carry out a prescribed processing.

In response, the anchor detection/change unit 4-8 reads out the page-A (5-50) from the page memory unit 4-2, detects the anchor containing a pointer to the page-B (5-51), and sets a display color of the character string for this anchor to an emphasized display color (such as red) (5-52).

Note that the prescribed processing and the condition for activating this prescribed processing are to be registered in advance in the processing set up table (5-60) provided inside the processing determination unit 4-7 as shown in FIG. 22.

According to this system of FIG. 22, the source information is transmitted to the source server, so that it becomes possible to reflect this source information into the description of the source page at the source server.

Note that it is also possible to make various modifications in this system of FIG. 22 as follows.

First, it is possible to implement the client function and the server function on the identical computer machine. In this case, the service is provided by using a large capacity memory medium such as CD-ROMs and optical disks for the page memory unit 4-2 of the server function. When this system is provided at a spot such as a street corner or a hotel lobby for public use, the display is automatically varied by reflecting the utilization state such that a popular link at that spot is indicated by the emphasized display when this popular link is used many times.

Next, in the system of FIG. 22, a timer can be provided in the processing determination unit 4-7 of the server so that the source information memory unit 4-6 is referred regularly and an anchor with no access or an anchor with an access frequency lower than a prescribed value is deleted. To this end, the anchor detection/change unit 4-8 can be provided with a list of anchors in the pages stored at the page memory units 4-2, or operated to scan through all the pages whenever commanded. By means of this processing, it becomes possible to automatically delete a link with a low access frequency, so that a cost required for the link management can be reduced.

Next, the client device 3-1 in the system of FIG. 22 is operated according to the first embodiment as described above in relation to the flow chart of FIG. 7, but it is also possible to operate this client device 3-1 according to the first modification of the first embodiment as described above in relation to the flow chart of FIG. 8, or according to the second modification of the first embodiment as described above in relation to the flow chart of FIG. 9, or according to the second embodiment as described above in relation to the flow chart of FIG. 10.

EXAMPLE-2

Next, a concrete example of a system using a client which can transmit the source information (containing the receiving result) independently from the page request, and a server which utilizes the source information (containing the receiving result).

Figure 23:
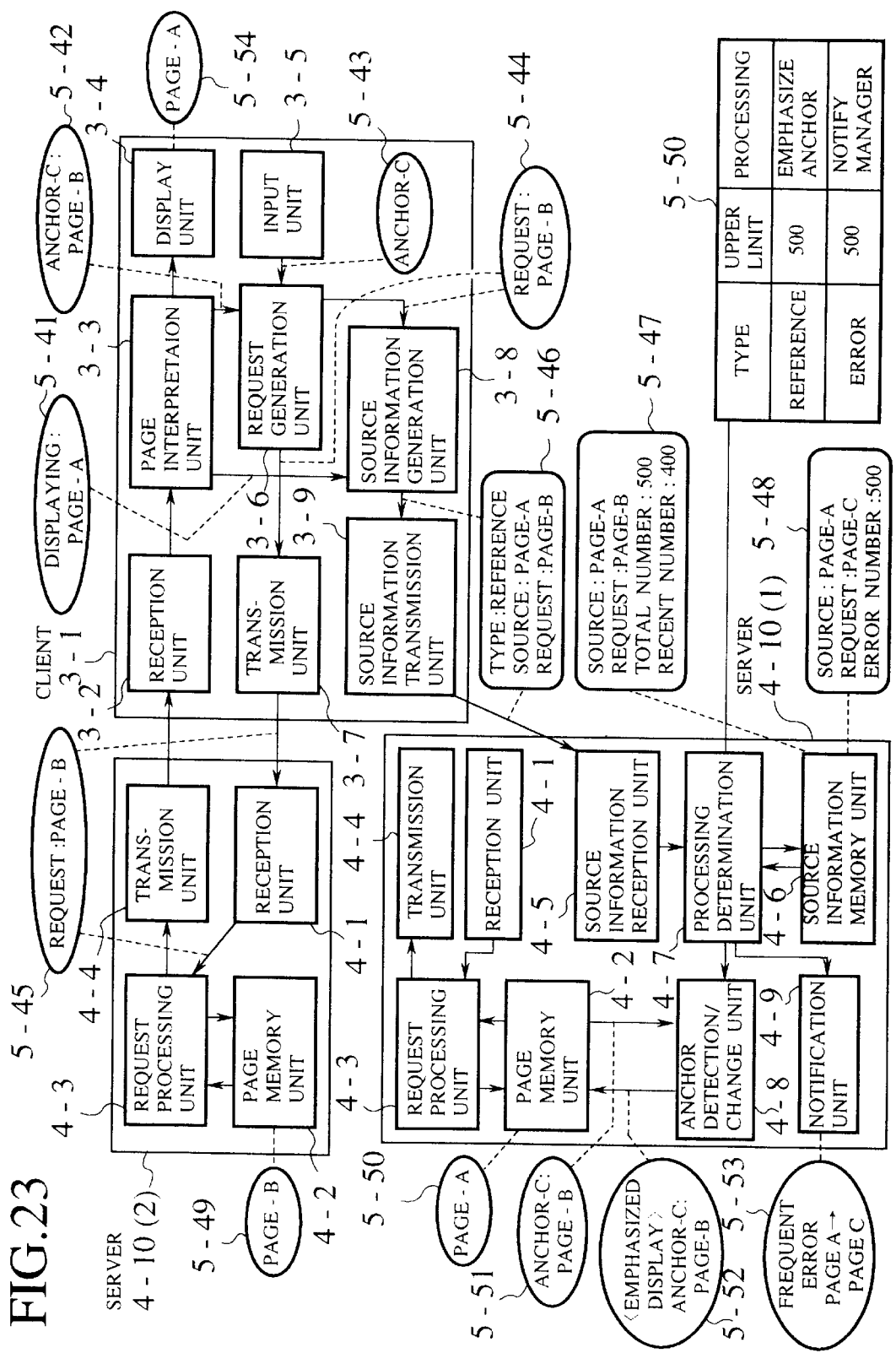
FIG. 23 is a block diagram of a second concrete example of a system according to the present invention which uses a client device and server devices.

FIG. 23 shows a system configuration in this example-2, where the client 3-1 has the same configuration as that of the second embodiment which is shown in FIG. 6 and operated according to the flow chart of FIG. 10, while the server 4-10 has the same configuration as that of the fourth embodiment which is shown in FIG. 13. Note however that the server 4-10 (2) is shown with only a partial internal configuration for the sake of simplicity.

Now, suppose that when the client 3-1 is currently displaying a page-A acquired from the server 4-10 (1) (5-54), a user selected an anchor-C in the page-A.

In this case, the exemplary operations in the client 3-1 are as follows. Namely, the input unit 3-5 of the client 3-1 notifies the fact that the anchor-C is selected to the request generation unit 3-6 (5-43). The request generation unit 3-6 generates a request message (5-44) requesting a page-B, according to a correspondence information (5-42) for the anchor received from the page interpretation unit 3-3 and a page, and gives this request message to the transmission unit 3-7 and the source information generation unit 3-8.

The page interpretation unit 3-3 always has an information (5-41) indicating a currently displayed page, and the source information generation unit 3-8 produces the source information (5-46) which indicates that "a page-B is referred from an anchor on a page-A", by using the currently displayed page information (5-41) and the request message (5-44) requesting the page-B. The source information (5-46) is not given to the transmission unit 3-7 so that this source information is not transmitted to the server 4-10 (2). The source information (5-46) is transmitted to the server (source server) 4-10 (2) which stores the page-A, through the source information transmission unit 3-9.

On the other hand, the transmission unit 3-7 transmits the request message (5-45) requesting the page-B to the request target server 4-10 (2), and then the reception unit 3-2 receives the page-B (5-49) returned from the server 4-10 (2) in response. Here the server 4-10 (2) operates similarly as a conventional server 1-1 shown in FIG. 3, so that the operations of the server 4-10 (2) will not be described here.

Next, the exemplary operations in the server 4-10 (1) are as follows.

In the server 4-10 (1), the source information reception unit 4-5 receives the source information (5-46) from the source information transmission unit 3-9 of the client 3-1, and gives this source information to the processing determination unit 4-7.

The processing determination unit 4-7 then analyzes the received message, and when its type field indicates "reference", the processing determination unit 4-7 judges that this is a message reporting successful reference, and carries out the following prescribed operation. Namely, the processing determination unit 4-7 extracts the source page identifier (page-A) and the request page identifier (page-B) from this source information, and searches through the source information memory unit 4-6 by using these extracted identifiers as keys. As a result, data (5-47) is found, and a counter labelled as "total number" is incremented by one while a counter labelled as "recent number" which is reset at a prescribed time in order to count a number of references in a single day (after 12:00 p.m.) is also incremented by one. Here, the "total number" exceeded a prescribed number (assumed to be 500 here) so that the processing determination unit 4-7 commands the anchor detection/change unit 4-8 to carry out a prescribed processing.

In response, the anchor detection/change unit 4-8 reads out the page-A (5-50) from the page memory unit 4-2, detects the anchor containing a pointer to the page-B (5-51), and sets a display color of the character string for this anchor to an emphasized display color (such as red) (5-52).

On the other hand, when a type field of the received message indicates "error", the processing determination unit 4-7 similarly searches through the source information memory unit 4-6 by using the extracted source page identifier and request page identifier as keys. As a result, data (5-48) is found, and a counter labelled as "error number" is incremented by one. Here, the "error number" exceeded a prescribed number (assumed to be 500 here) so that the processing determination unit 4-7 commands the notification unit 4-9 to send an error notice to the server manager, and in response, the notification unit 4-9 transmits an error mail (5-53) to the server manager.

Note that the prescribed processing and the condition for activating this prescribed processing are to be registered in advance in the processing set up table (5-50) provided inside the processing determination unit 4-7 as shown in FIG. 23.

According to this system of FIG. 23, the source information is transmitted to the source server, so that it becomes possible to reflect this source information into the description of the source page at the source server.

Note that it is also possible to make various modifications in this system of FIG. 23 as follows.

First, the source information transmission unit 3-9 of the client 3-1 transmits the source information in a format readable by the source server in the system of FIG. 23, but it is possible to modify this aspect of the system of FIG. 23 such that the source information is to be transmitted in a format readable by the server manager. Namely, the source information (5-46) in FIG. 23 are expressed by character strings, and this source information expressed by character strings is transmitted to the server manager in a form of an electronic mail for example, in the similar manner as the notice sent from the notification unit 4-9 to the server manager. With this modification, the judgement processing at the processing determination unit 4-7 can be omitted, so that it becomes possible to quickly cope with a case where a serious error is occurring.

Next, it is possible to implement the client function and the server function on the identical computer machine. In this case, the service is provided by using a large capacity memory medium such as CD-ROMs and optical disks for the page memory unit 4-2 of the server function. When this system is provided at a spot such as a street corner or a hotel lobby for public use, the display is automatically varied by reflecting the utilization state such that a popular link at that spot is indicated by the emphasized display when this popular link is used many times.

Next, in the system of FIG. 22, a timer can be provided in the processing determination unit 4-7 of the server so that the source information memory unit 4-6 is referred regularly and an anchor with no access or an anchor with an access frequency lower than a prescribed value is deleted. To this end, the anchor detection/change unit 4-8 can be provided with a list of anchors in the pages stored at the page memory units 4-2, or operated to scan through all the pages whenever commanded. By means of this processing, it becomes possible to automatically delete a link with a low access frequency, so that a cost required for the link management can be reduced.

EXAMPLE-3

Next, a concrete example of a system using a relay server in which a number of source information is counted at the relay server and transmitted to a server.

Figure 24:
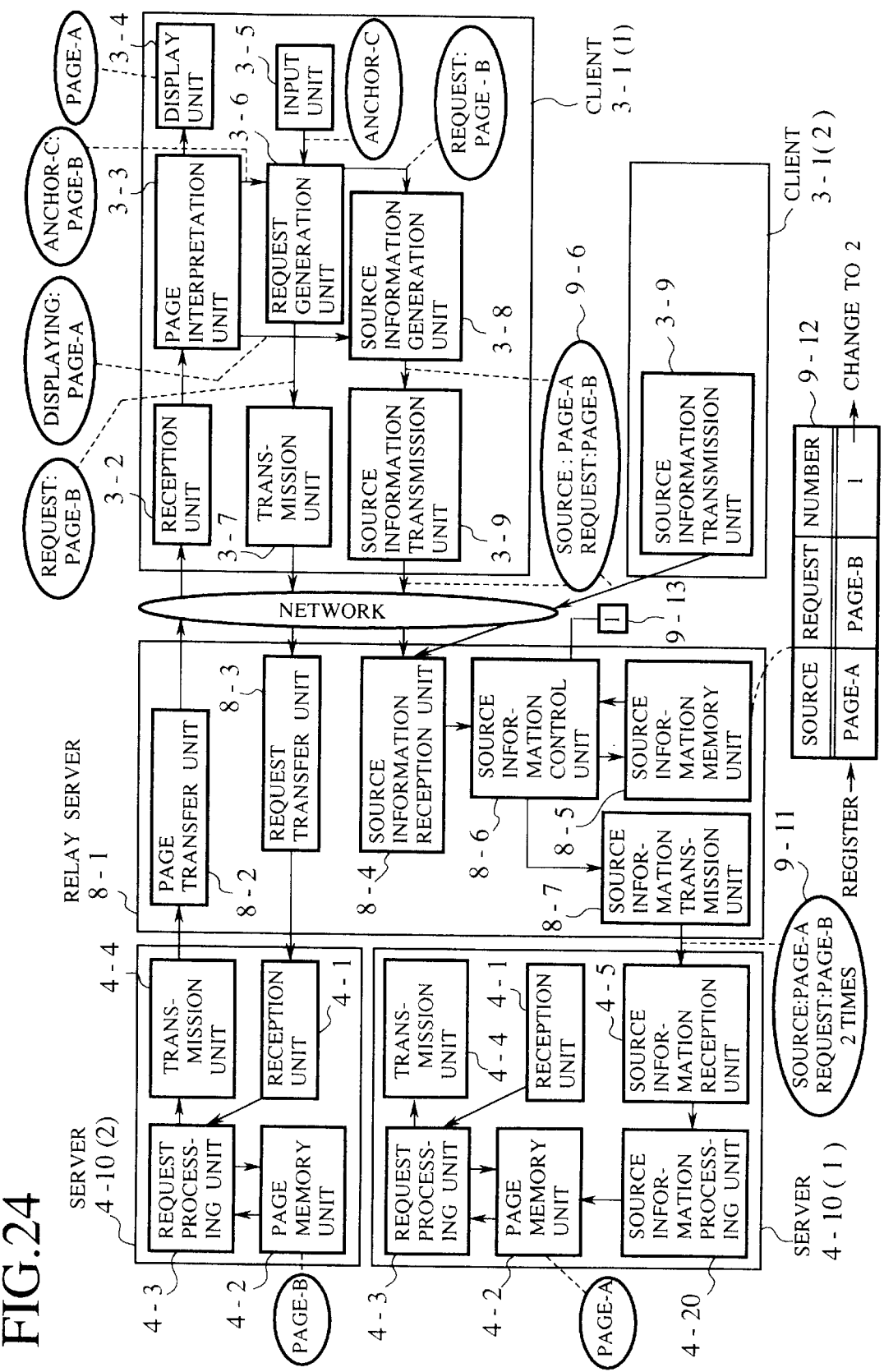
FIG. 24 is a block diagram of a third concrete example of a system according to the present invention which uses a relay server device.

FIG. 24 shows a system configuration in this example-3, where the client 3-1 has the same configuration as that of the first embodiment which is shown in FIG. 6. Note however that the client 3-1 (2) is shown with only a partial internal configuration for the sale of simplicity. In this system of FIG. 24, the client operates similarly as in the above examples so that its operations will not be described here.

Also, the server 4-10 has the same configuration as that of the third or fourth embodiment which is shown in FIG. 11 or FIG. 13. In FIG. 24, the server 4-10 (1) has a source information processing unit 4-20 which collectively represents the source information memory unit 4-6, the processing determination unit 4-7, and the anchor detection/change unit 4-8 (and the notification unit 4-9) of the above description. Note also that the server 4-10 (2) is shown with only a partial internal configuration for the sake of simplicity. In this system of FIG. 24, the server operates similarly as in the above examples so that its operations will not be described here.

On the other hand, the relay server 8-1 has the same configuration as that of the fifth embodiment which is shown in FIG. 15. In FIG. 24, this relay server 8-1 is located between a plurality of clients and a plurality of servers, and functions to count a number of source information.

The source information control unit 8-6 is connected with a register 9-13 in which a prescribed number of receptions for determining a timing to activate an operation to transmit the source information (containing the request page information) to the server is registered in advance. In FIG. 24, the register 9-13 registers a number 1, indicating that the source information is to be transmitted to the server when a number of receptions exceeds 1.

When the source information (9-6) indicating that "a page-B is requested by using an anchor on a page-A" is sent from the client 3-1 (1) to the relay server 8-1, this source information is received by the source information reception unit 8-4, and given to the source information control unit 8-6.

The source information control unit 8-6 then searches through the source information stored in the source information memory unit 8-5 by using the source page-A and the request page-B (source server identifier, source page identifier, request target server identifier, request page identifier) as keys. As a result, it is found that this source information is received for the first time and not yet registered, so that this source information is registered (9-12). At this point, a number of receptions (which is equal to 1 as this is the first time) and a content of the register 9-13 are compared, but a number of receptions is not greater than a prescribed number (assumed to be 1 here) so that no operation is activated.

Next, when the source information having the identical keys as the source information (9-6) is received from the client 3-1 (2), the source information control unit 8-6 similarly searches through the source information stored in the source information memory unit 8-5 by using the source page-A and the request page-B as keys. This time, this source information is already registered, so that a number of receptions is incremented by one (set equal to 2). At this point, a number of receptions and a content of the register 9-13 are compared, and it is found that a number of receptions exceeded a prescribed number (assumed to be 1 here) for activating the operation to transmit the source information to the server, so that the source information control unit 8-6 gives the corresponding source information and number of receptions to the source information transmission unit 8-7 and commands the transmission to the server.

In response, the source information transmission unit 8-7 transmits the source information message (9-11) by using the identifier of the source server 4-10 (1) which is obtained from the source page information in the source information as its destination.

When a counted number of the source information exceeds a prescribed number, a page description is often changed. When this counting operation is to be carried out by the server itself, it is necessary to process all the source information sequentially, and such an extra operation by the server may adversely affect the page storing and providing functions which are the main functions of the server. In this regard, when the counting operation is carried out by the relay server as described above, a processing load of the counting operation can be removed from the server. In addition, when the relay servers are connected hierarchically, the counting operation is carried out also hierarchically so that the efficiency can be improved even further.

EXAMPLE-4

Next, a concrete example of a system using a relay server in which the source information of the present invention is separated from the page request message at the relay server and transmitted to a server.

FIG. 25 shows a system configuration in this example-4, where the client 1-11 has the same configuration as that of the conventional client device which is shown in FIG. 2. In this system of FIG. 25, the client operates similarly as already described in relation to FIG. 2, so that its operations will not be described here.

Also, the server 4-10 has the same configuration as that of the third or fourth embodiment which is shown in FIG. 11 or FIG. 13. In FIG. 25, the server 4-10 (1) has a source information processing unit 4-20 which collectively represents the source information memory unit 4-6, the processing determination unit 4-7, and the anchor detection/change unit 4-8 (and the notification unit 4-9) of the above description. Note also that the server 4-10 (2) is shown with only a partial internal configuration for the sake of simplicity. In this system of FIG. 25, the server operates similarly as in the above examples so that its operations will not be described here.

On the other hand, the relay server 10-1 has the same configuration as that of the sixth embodiment which is shown in FIG. 17. In FIG. 25, this relay server 10-1 is located between a client and a plurality of servers, and functions to separate the source information.

In the relay server 10-1, the source page information (source server identifier and the source page identifier) is extracted from the received request message (11-5) at the source information separation unit 10-4, and the page request message (11-6) which does not contain the extracted source page information is produced and transferred to the request target server 4-10 (2) through the request transfer unit 10-3. In addition, the request page information (request page identifier and the request target server identifier) is also extracted from the received request message (11-5), and the source information separation unit 10-4 also produces the source information which contains the extracted source page information and the extracted request page information as its contents.

Then, the source information transmission unit 10-5 transmits the source information message (11-9) by using the identifier of the source server 4-10 (1) which is obtained from the source page information in the source information as its destination.

In general, not every client can transmit the source information separately from the page request, but in the system of FIG. 25, it is possible to obtain the source information to be transmitted to the source server even in a case of a system which only uses the conventional client devices, or a system which mixedly uses the conventional client devices and the client devices of the present invention.

It is possible to modify this system of FIG. 25 in such a manner that the source information separation unit 10-4 and the source information transmission unit 10-5 are provided separately from the relay server 10-1 and directly connected to the transmission unit 1-17 of the client 1-11. In this manner, it is possible to make the conventional client device 1-11 to behave as if it is the client device of the present invention.

It is also possible to modify this system of FIG. 25 in such a manner that the information concerning the source is not removed from the page request to be transferred from the relay server 10-1 to the server 4-10. In such a case, the source information is going to be transmitted to two servers.

EXAMPLE-5

Next, a concrete example of a system using a relay server in which the source information is generated at the relay server and transmitted to a server.

Figure 26:
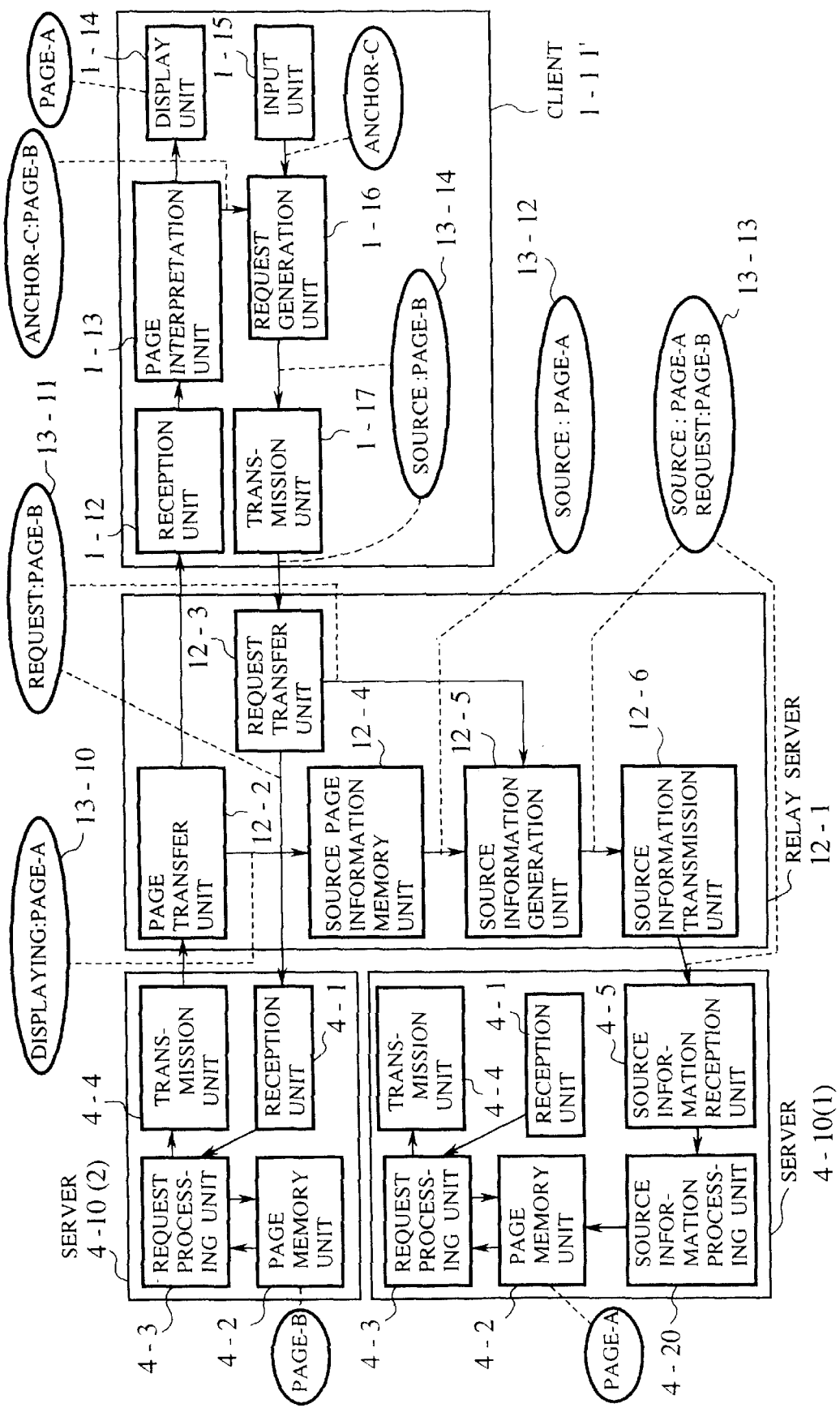
FIG. 26 is a block diagram of a fifth concrete example of a system according to the present invention which uses a relay server device.

FIG. 26 shows a system configuration in this example-5, where the client 1-11' has the similar configuration as that of the conventional client device which is shown in FIG. 2, except that the source information generation unit 1-18 is omitted. In this system of FIG. 26, the client operates similarly as already described in relation to FIG. 2 except that the operation related to the source information generation unit 1-18 is omitted, so that its operations will not be described here.

Also, the server 4-10 has the same configuration as that of the third or fourth embodiment which is shown in FIG. 11 or FIG. 13. In FIG. 26, the server 4-10 (1) has a source information processing unit 4-20 which collectively represents the source information memory unit 4-6, the processing determination unit 4-7, and the anchor detection/change unit 4-8 (and the notification unit 4-9) of the above description. Note also that the server 4-10 (2) is shown with only a partial internal configuration for the sake of simplicity. In this system of FIG. 26, the server operates similarly as in the above examples so that its operations will not be described here.

On the other hand, the relay server 12-1 has the same configuration as that of the seventh embodiment which is shown in FIG. 19. In FIG. 26, this relay server 12-1 is located between a client and a plurality of servers, and functions to generate the source information.

When the client 1-11' acquired the currently displayed page-A, the relay server 12-1 records the fact that this page-A is acquired in a form of the source page information. Namely, when the page-A transmitted from the transmission unit 4-4 of the server 4-10 (1) is received at the page transfer unit 12-2, the identifier of that server and the identifier of that page are copied (13-10) and stored as the source page information in the source page information memory unit 12-4 while attaching the identifier of the client which requested that page to this source page information.

Then, when the request message (13-14) requesting the page-B from the client 1-11' is received at the relay server 12-1, the request transfer unit 12-3 transfers this request message to the server 4-10 (2), while notifying the source information generation unit 12-5 that the client 1-11' requested the page-B (13-11).

In response, the source information generation unit 12-5 searches through the source page information stored in the source page information memory unit 12-4 by using the client identifier as a key, and obtains the source page information (source server identifier and the source page identifier) corresponding to the currently displayed page-A of the client 1-11' (13-12). Then, the source information generation unit 12-5 generates the source information message (13-13) which contains the obtained source page information and the request page information obtained from the request message as its contents, and commands the source information transmission unit 12-6 to transmit this source information message (13-13).

Then, the source information transmission unit 12-6 transmits the source information message (13-13) by using the identifier of the source server 4-10 (1) which is obtained from the source page information in the source information as its destination.

As already mentioned above, HTTP/1.0 recommends not to transmit the source information too much, so that a use of the client which does not have the source information generation unit can be expected. However, when the page on the server can be maintained in a form which is accurate and easy to see by utilizing the source information, it can provide a useful information to the source server as well as to the user. In this regard, in the system of FIG. 26, the source information can be obtained and transmitted to the source server even when the system includes a client which does not transmit the source information.

As described, according to the present invention, it becomes possible to transmit the source information concerning the page request made from the source page at the client device to the source server device which is different from the page request target server device. Consequently, it becomes possible to transmit the source information from the client device to the source server device which stores the source page.

Also, according to the present invention, it becomes possible for the source server device to obtain the source information which indicates a utilization state of the source page by a user. Consequently, it becomes possible for the source server device to comprehend the utilization state of the anchors in the source page and realize the effective link management by utilizing the obtained source information.

Also, according to the present invention, a processing load of the server device can be reduced, by carrying out the counting of the source information at the relay server device provided between the client device and the server device.

Also, according to the present invention, it becomes possible for the source server side to obtain an information on a utilization state of the anchor at the conventional client device, by using the relay server device provided between the client device and the server device which is capable of notifying the source information indicative of a utilization state of the anchor to the source server according to an information concerning the source page which is contained in the page request message.

Also, according to the present invention, it becomes possible for the source server side to obtain an information on a utilization state of the anchor at the conventional client device, by using the relay server device provided between the client device and the server device which is capable of notifying the source information indicating of a utilization state of the anchor to the source server according to a page transfer record and a page request transfer record.

It is to be noted that, as already mentioned above, the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A client device for acquiring and displaying hypermedia documents in a hypermedia document processing system, comprising:

display means for interpreting and displaying a first page of the hypermedia documents acquired from one server;

first transmission means for transmitting a first message requesting a second page of the hypermedia documents to be referred displayed by t page currently displayed by the display means to a request target server which stores the second page; and second transmission means for transmitting a second message including a source information which contains (a) a source server identifier for identifying said one server in the system, (b) a source page identifier for identifying the first page in the system, (c) a request page identifier for identifying the second page in the system, and (d) a request target server identifier for identifying the request target server in the system, to either one of said one server or a relay server connected to said one server.

2. The client device of claim 1, wherein the second transmission means transmits the second message only when a source information transmission is specified in advance with respect to a hypermedia document containing the first page.

3. The client device of claim 1, wherein the second transmission means stores more than one second messages before transmitting said more than one second messages, and transmits said more than one second messages altogether when a number of stored second messages exceeds a prescribed number.

4. The client device of claim 3, wherein the second transmission means counts said number of stored second messages by using at least one of the source server identifier, the source page identifier, the request page identifier, and the request target server identifier as a key.

5. The client device of claim 1, wherein the second transmission means stores one second message for a reference from the first page to the second page, counts a number of subsequent occurrences of said reference from the first page to the second page as a number of references, and transmits said one second message by attaching an information on said number of references when said number of references exceeds a prescribed number.

6. The client device of claim 5, wherein the second transmission means counts said number of references by using at least one of the source server identifier, the source page identifier, the request page identifier, and the request target server identifier as a key.

7. The client device of claim 1, wherein the second transmission means transmits the second message which also includes a receiving result information indicating whether the second page is received by the client device in response to the first message or not.

8. The client device of claim 7, wherein the second transmission means transmits the second message which also includes an error content information indicating a cause of a failure to receive the second page when the receiving result information indicates that the second page is not received by the client device in response to the first message.

9. A server device for storing and providing hypermedia documents in a hypermedia document processing system, comprising:

transmission means for storing the hypermedia documents and transmitting a first page of the hypermedia documents in response to a request received from a client;

reception means for receiving a source information message including a source information which contains (a)

a source server identifier for identifying said server device in the system, (b) a source page identifier for identifying the first page in the system, (c) a request page identifier for identifying a second page to be referred from the first page by the client in the system, and (d) a request target server identifier for identifying a request target server which stores the second page in the system; and processing means for carrying out a prescribed processing according to the source information in the source information message received by the reception means.

10. The server device of claim 9, wherein the processing means carries out the prescribed processing which changes a display of the first page according to a frequency of references from the first page to the second page obtained from the source information.

11. The server device of claim 9, wherein the reception means receives the source information message which also includes a receiving result information indicating whether the second page is received by the client from the request target server or not, and the processing means carries out the prescribed processing which changes/deletes a link from the first page to the second page when the receiving result information indicates that the second page is not received by the client from the request target server.

12. The server device of claim 9, wherein the reception means receives the source information message which also includes a receiving result information indicating whether the second page is received by the client from the request target server or not, and the processing means carries out the prescribed processing which notifies an error in a link from the first page to the second page to a server manager, when the receiving result information indicates that the second page is not received by the client from the request target server.

13. The server device of claim 9, wherein the processing means records the source information included in the source information message received by the reception means, counts a number of recordings of the source information, and carries out the prescribed processing when said number of recordings exceeds a prescribed number.

14. The server device of claim 13, wherein the processing means counts said number of recordings by using the source page identifier, the request page identifier, and the request target server identifier as keys.

15. A relay server device for transferring messages between clients for acquiring and displaying hypermedia documents and servers for storing and providing hypermedia documents in a hypermedia document processing system, comprising:

reception means for receiving a source information message from one client which displays a first page of the hypermedia documents acquired from a source server and requesting a second page of the hypermedia documents to be referred from the first page, the source information message including a source information which contains (a) a source server identifier for identifying the source server in the system, (b) a source page identifier for identifying the first page in the system, (c) a request page identifier for identifying the second page in the system, and (d) a request target server identifier for identifying a request target server which stores the second page in the system; and transmission means for storing more than one source information messages received by the reception means, and transmitting stored source information messages to respective source servers.

16. The relay server device of claim 15, wherein the transmission means stores each distinct source information message received by the reception means, each distinct source information message including the source information which contains an identical combination of the source server identifier, the source page identifier, the request page identifier, and the request target server identifier, counts a number of receptions of each distinct source information message, and transmits stored source information messages to respective source servers when a total of said number of receptions for all distinct source information messages exceeds a prescribed number.

17. The relay server device of claim 16, wherein the transmission means transmits each distinct source information message by attaching an information on said number of receptions of said each distinct source information message.

18. The relay server device of claim 15, wherein the transmission means stores all source information messages received by the reception means, counts a number of receptions of each distinct source information message, and transmits stored source information messages corresponding to each distinct source information message when said number of receptions of each distinct source information message exceeds a prescribed number.

19. The relay server device of claim 18, wherein the transmission means counts said number of receptions of each distinct source information message by using at least one of the source server identifier, the source page identifier, the request page identifier, and the request target server identifier as a key.

20. A relay server device for transferring messages between clients for acquiring and displaying hypermedia documents and servers for storing and providing hypermedia documents in a hypermedia document processing system, comprising:

reception means for receiving a first message from one client which is currently displaying a first page of the hypermedia documents acquired from one server, the first message requesting a second page of the hypermedia documents to be referred from the first page to a request target server which stores the second page; and transmission means for generating a second message from the first message received by the reception means, the second message including a source information which contains (a) a source server identifier for identifying said one server in the system, (b) a source page identifier for identifying the first page in the system, (c) a request page identifier for identifying the second page in the system, and (d) a request target server identifier for identifying the request target server in the system, and transmitting the second message to said one server.

21. The relay server device of claim 20, wherein the transmission means generates the second message by separating a source page information which contains the source server identifier and the source page identifier and a request page information which contains the request page identifier and the request target server identifier from the first message, and forming the source information by combining the source page information and the request page information separated from the first message.

22. A relay server device for transferring messages between clients for acquiring and displaying hypermedia documents and servers for storing and providing hypermedia documents in a hypermedia document processing system, comprising:

page transfer means for transferring a page message for a first page of the hypermedia documents from one server to one client, including a source page information which contains a source server identifier for identifying said one server in the system and a source page identifier for identifying the first page in the system;

request transfer means for transferring a request message from said one client which is currently displaying the first page of the hypermedia documents acquired from said one server, the request message requesting a second page of the hypermedia documents to be referred from the first page to a request target server which stores the second page, and including a request page information which contains a request page identifier for identifying the second page in the system and a request target server identifier for identifying the request target server in the system; and transmission means for generating a source information message including a source information which contains the source server identifier and the source page identifier obtained from the page message transferred by the page transfer means, and the request page identifier and the request target server identifier obtained from the request message transferred by the request transfer means, and transmitting the source information message to said one server.

23. The relay server device of claim 22, further comprising:

memory means for storing the source page information extracted from the page message transferred by the page transfer means, by using a client identifier for identifying said one client in the system as a key;

wherein the transmission means generates the source information message by reading out the source page information from the memory means according to the client identifier extracted from the request message, and combining the source page information read out from the memory means with the request page information extracted from the request message.

24. A hypermedia document processing system, comprising:

a plurality of client devices, including one client device which interprets and displays a first page of the hypermedia documents acquired from one server device; transmits a first message requesting a second page of the hypermedia documents to be referred from the first page to a request target server which stores the second page; and transmits a second message including a source information which contains (a) a source server identifier for identifying said one server device in the system, (b) a source page identifier for identifying the first page in the system, (c) a request page identifier for identifying the second page in the system, and (d) a request target server identifier for identifying the request target server in the system, to said one server device; and a plurality of server devices, including said one server device which stores the hypermedia documents and transmits the first page of the hypermedia documents in response to a request issued by said one client device; receives the second message from said one client device; and carries out a prescribed processing according to the source information in the second message.

25. A hypermedia document processing system, comprising:

a plurality of client devices, including one client device;
a plurality of server devices, including one server device; and a relay server device connected between said one client device and said one server device;

wherein said one client device interprets and displays a first page of the hypermedia documents acquired from said one server device; transmits a first message requesting a second page of the hypermedia documents to be referred from the first page to a request target server which stores the second page; and transmits a second message including a source information which contains (a) a source server identifier for identifying said one server device in the system, (b) a source page identifier for identifying the first page in the system, (c) a request page identifier for identifying the second page in the system, and (d) a request target server identifier for identifying the request target server in the system, to the relay server device; and the relay server device receives more than one second messages from more than one of the client devices, stores said more than one second messages, and transmits stored second messages to respective source servers; and said one server device which stores the hypermedia documents and transmits the first page of the hypermedia documents in response to a request issued by said one client device; receives the second message from the relay server device; and carries out a prescribed processing according to the source information in the second message.

26. A hypermedia document processing system, comprising:

a plurality of client devices, including one client device;
a plurality of server devices, including one server device; and a relay server device connected between said one client device and said one server device;

wherein said one client device interprets and displays a first page of the hypermedia documents acquired from said one server device; and transmits a request message requesting a second page of the hypermedia documents to be referred from the first page to a request target server which stores the second page, the request message including a source page information which contains a source server identifier for identifying said one server device in the system and a source page identifier for identifying the first page in the system, and a request page information which contains a request page identified for identifying the second page in the system and a request target server identifier for identifying the request target server in the system;

the relay server device receives the request message transmitted from said one client device; generates a source information message from the request message, the source information message including a source information which contains the source server identifier, the source page identifier, the request page identifier, and the request target server identifier; and transmits the source information message to said one server; and said one server device stores the hypermedia documents and transmits the first page of the hypermedia documents in response to a request issued by said one client device; receives the source information message from the relay server device; and carries out a prescribed processing according to the source information in the source information message.

27. A hypermedia document processing system, comprising:

a plurality of client devices, including one client device;
a plurality of server devices, including one server device; and
a relay server device connected between said one client device and said one server device;
wherein said one client device interprets and displays a first page of the hypermedia documents acquired from one server device; and transmits a request message requesting a second page of the hypermedia documents to be referred from the first page to a request target server which stores the second page, the request message including a request page information which contains a request page identifier for identifying the second page in the system and a request target server identifier for identifying the request target server in the system;
said relay server device transfers a page message for the first page from said one server device to said one client device, the page message including a source page information which contains a source server identifier for identifying said one server device in the system and a source page identifier for identifying the first page in the system; transfers the request message from said one client device to said one server device; and generates a source information message including a source information which contains the source server identifier and the source page identifier obtained from the page message, and the request page identifier and the request target server identifier obtained from the request message, and transmits the source information message to said one server device; and
said one server device stores the hypermedia documents and transmits the page message for the first page in response to a request issued by said one client device; receives the source information message from the relay server device; and carries out a prescribed processing according to the source information in the source information message.

28. A method for message transmission by a client device which is interpreting and displaying a first page of the hypermedia documents acquired from one server in a hypermedia document processing system, comprising the steps of:
transmitting a first message requesting a second page of the hypermedia documents to be referred from the first page to a request target server which stores the second page; and
transmitting a second message including a source information which contains (a) a source server identifier for identifying said one server in the system, (b) a source page identifier for identifying the first page in the system, (c) a request page identifier for identifying the second page in the system, and (d) a request target server identifier for identifying the request target server in the system, to either one of said one server or a relay server connected to said one server.

29. A method for page processing by a server device which is storing the hypermedia documents and transmitting a first page of the hypermedia documents in response to a request received from a client in a hypermedia document processing system, comprising the steps of:
receiving a source information message including a source information which contains (a) a source server identifier for identifying said server device in the system, (b) a source page identifier for identifying the first page in the system, (c) a request page identifier for identifying a second page to be referred from the first page by the client in the system, and (d) a request target server identifier for identifying a request target server which stores the second page in the system; and
carrying out a prescribed processing according to the source information in the source information message received by the receiving step.

30. A method for message transmission by a relay server device for transferring messages between clients for acquiring and displaying hypermedia documents and servers for storing and providing hypermedia documents in a hypermedia document processing system, comprising the steps of:
receiving a source information message from one client which displays a first page of the hypermedia documents acquired from a source server and requesting a second page of the hypermedia documents to be referred from the first page, the source information message including a source information which contains (a) a source server identifier for identifying the source server in the system, (b) a source page identifier for identifying the first page in the system, (c) a request page identifier for identifying the second page in the system, and (d) a request target server identifier for identifying a request target server which stores the second page in the system;
storing more than one source information messages received by the receiving step; and
transmitting stored source information messages to respective source servers.

31. A method for message transmission by a relay server device for transferring messages between clients for acquiring and displaying hypermedia documents and servers for storing and providing hypermedia documents in a hypermedia document processing system, comprising the steps of:
receiving a first message from one client which is currently displaying a first page of the hypermedia documents acquired from one server, the first message requesting a second page of the hypermedia documents to be referred from the first page to a request target server which stores the second page;
generating a second message from the first message received by the receiving step, the second message including a source information which contains (a) a source server identifier for identifying said one server in the system, (b) a source page identifier for identifying the first page in the system, (c) a request page identifier for identifying the second page in the system, and (d) a request target server identifier for identifying the request target server in the system; and
transmitting the second message to said one server.

32. A method for message transmission by a relay server device for transferring messages between clients for acquiring and displaying hypermedia documents and servers for storing and providing hypermedia documents in a hypermedia document processing system, comprising the steps of:
transferring a page message for a first page of the hypermedia documents from one server to one client, the page message including a source page information which contains a source server identifier for identifying said one server in the system and a source page identifier for identifying the first page in the system;
transferring a request message from said one client which is currently displaying the first page of the hypermedia documents acquired from said one server, the request message requesting a second page of the hypermedia documents to be referred from the first page to a request target server which stores the second page, and including a request page information which contains a request page identifier for identifying the second page in the system and a request target server identifier for identifying the request target server in the system;

generating a source information message including a source information which contains the source server identifier and the source page identifier obtained from the page message, and the request page identifier and the request target server identifier obtained from the request message; and transmitting the source information message to said one server.

33. A method for message transmission in a hypermedia document processing system formed by a plurality of client devices including one client device which interprets and displays a first page of the hypermedia documents acquired from one server device, and a plurality of server devices including said one server device which stores the hypermedia documents and transmits the first page of the hypermedia documents in response to a request issued by said one client device, the method comprising the steps of:

transmitting from said one client device a first message requesting a second page of the hypermedia documents to be referred from the first page to a request target server which stores the second page;

transmitting a second message including a source information which contains (a) a source server identifier for identifying said one server device in the system, (b) a source page identifier for identifying the first page in the system, (c) a request page identifier for identifying the second page in the system, and (d) a request target server identifier for identifying the request target server in the system, from said one client device to said one server device;

receiving the second message from said one client device at said one server device; and carrying out a prescribed processing according to the source information in the second message at said one server device.

34. A method for message transmission in a hypermedia document processing system formed by a plurality of client devices including one client device which interprets and displays a first page of the hypermedia documents acquired from one server device, a plurality of server devices including said one server device which stores the hypermedia documents and transmits the first page of the hypermedia documents in response to a request issued by said one client device, and a relay server device connected between said one client device and said one server device, the method comprising the steps of:

transmitting from said one client device a first message requesting a second page of the hypermedia documents to be referred from the first page to a request target server which stores the second page;

transmitting a second message including a source information which contains (a) a source server identifier for identifying said one server device in the system, (b) a source page identifier for identifying the first page in the system, (c) a request page identifier for identifying the second page in the system, and (d) a request target server identifier for identifying the request target server in the system, from said one client device to the relay server device;

receiving more than one second messages from more than one of the client devices and storing said more than one second messages at the relay server device;

transmitting stored second messages from the relay server device to respective source servers;

receiving the second message from the relay server device at said one server device; and carrying out a prescribed processing according to the source information in the second message at said one server device.

35. A method for message transmission in a hypermedia document processing system formed by a plurality of client devices including one client device which interprets and displays a first page of the hypermedia documents acquired from one server device, a plurality of server devices including said one server device which stores the hypermedia documents and transmits the first page of the hypermedia documents in response to a request issued by said one client device, and a relay server device connected between said one client device and said one server device, the method comprising the steps of:

transmitting from said one client device a request message requesting a second page of the hypermedia documents to be referred from the first page to a request target server which stores the second page, the request message including a source page information which contains a source server identifier for identifying said one server device in the system and a source page identifier for identifying the first page in the system, and a request page information which contains a request page identifier for identifying the second page in the system and a request target server identifier for identifying the request target server in the system;

receiving the request message transmitted from said one client device at the relay server device;

generates at the relay server device a source information message from the request message, the source information message including a source information which contains the source server identifier, the source page identifier, the request page identifier, and the request target server identifier;

transmitting the source information message from the relay server device to said one server;

receiving the source information message from the relay server device at said one server device; and carrying out a prescribed processing according to the source information in the source information message at said one server device.

36. A method for message transmission in a hypermedia document processing system formed by a plurality of client devices including one client device which interprets and displays a first page of the hypermedia documents acquired from one server device, a plurality of server devices including said one server device which stores the hypermedia documents and transmits the first page of the hypermedia documents in response to a request issued by said one client device, and a relay server device connected between said one client device and said one server device, the method comprising the steps of:

transmitting from said one client device a request message requesting a second page of the hypermedia documents to be referred from the first page to a request target server which stores the second page, the request message including a request page information which contains a request page identifier for identifying the second page in the system and a request target server identifier for identifying the request target server in the system;

transferring at the relay server device a page message for the first page from said one server device to said one client device, the page message including a source page information which contains a source server identifier for identifying said one server device in the system and a source page identifier for identifying the first page in the system;

transferring at the relay server device the request message from said one client device to said one server device;

generating at the relay server device a source information message including a source information which contains the source server identifier and the source page identifier obtained from the page message, and the request page identifier and the request target server identifier obtained from the request message;

transmitting the source information message from the relay server device to said one server device;

receiving the source information message from the relay server device at said one server device; and carrying out a prescribed processing according to the source information in the source information message at said one server device.

37. An article of manufacture, comprising:

a computer usable medium having computer readable program code means embodied therein for causing a computer to function as a client device for acquiring and displaying hypermedia documents in a hypermedia document processing system, the computer readable program code means including:

first computer readable program code means for causing said computer to interpret and display a first page of the hypermedia documents acquired from one server;

second computer readable program code means for causing said computer to transmit a first message requesting a second page of the hypermedia documents to be referred from the first page to a request target server which stores the second page; and third computer readable program code means for causing said computer to transmit a second message including a source information which contains (a) a source server identifier for identifying said one server in the system, (b) a source page identifier for identifying the first page in the system, (c) a request page identifier for identifying the second page in the system, and (d) a request target server identifier for identifying the request target server in the system, to either one of said one server or a relay server connected to said one server.

38. An article of manufacture, comprising:

a computer usable medium having computer readable program code means embodied therein for causing a computer to function as a server device for storing and providing hypermedia documents in a hypermedia document processing system, the computer readable program code means including:

first computer readable program code means for causing said computer to store the hypermedia documents and transmit a first page of the hypermedia documents in response to a request received from a client;

second computer readable program code means for causing said computer to receive a source information message including a source information which contains (a) a source server identifier for identifying said server device in the system, (b) a source page identifier for identifying the first page in the system, (c) a request page identifier for identifying a second page to be referred from the first page by the client in the system, and (d) a request target server identifier for identifying a request target server which stores the second page in the system; and third computer readable program code means for causing said computer to carry out a prescribed processing according to the source information in the source information message received by the second computer readable program code means.

39. An article of manufacture, comprising:

a computer usable medium having computer readable program code means embodied therein for causing a computer to function as a relay server device for transferring messages between clients for acquiring and displaying hypermedia documents and servers for storing and providing hypermedia documents in a hypermedia document processing system, the computer readable program code means comprising:

first computer readable program code means for causing said computer to receive a source information message from one client which is currently displaying a first page of the hypermedia documents acquired from a source server and requesting a second page of the hypermedia documents to be referred from the first page, the source information message including a source information which contains (a) a source server identifier for identifying the source server in the system, (b) a source page identifier for identifying the first page in the system, (c) a request page identifier for identifying the second page in the system, and (d) a request target server identifier for identifying a request target server which stores the second page in the system;

second computer readable program code means for causing said computer to store more than one source information messages received by the first computer readable program code means; and third computer readable program code means for causing said computer to transmit stored source information messages to respective source servers.

40. An article of manufacture, comprising:

a computer usable medium having computer readable program code means embodied therein for causing a computer to function as a relay server device for transferring messages between clients for acquiring and displaying hypermedia documents and servers for storing and providing hypermedia documents in a hypermedia document processing system, the computer readable program code means comprising:

first computer readable program code means for causing said computer to receive a first message from one client which is currently displaying a first page of the hypermedia documents acquired from one server, the first message requesting a second page of the hypermedia documents to be referred from the first page to a request target server which stores the second page;

second computer readable program code means for causing said computer to generate a second message from the first message received by the first computer readable program code means, the second message including a source information which contains (a) a source server identifier for identifying said one server in the system, (b) a source page identifier for identifying the first page in the system, (c) a request page identifier for identifying the second page in the system, and (d) a request target server identifier for identifying a request target server which stores the second page in the system; and third computer readable program code means for causing said computer to transmit the second message to said one server.

41. An article of manufacture, comprising:

a computer usable medium having computer readable program code means embodied therein for causing a computer to function as a relay server device for transferring messages between clients for acquiring and displaying hypermedia documents and servers for storing and providing hypermedia documents in a hypermedia document processing system, the computer readable program code means comprising:

first computer readable program code means for causing said computer to transfer a page message for a first page of the hypermedia documents from one server to one client, the page message including a source page information which contains a source server identifier for identifying said one server in the system and a source page identifier for identifying the first page in the system;

second computer readable program code means for causing said computer to transfer a request message from said one client which is currently displaying the first page of the hypermedia documents acquired from said one server, the request message requesting a second page of the hypermedia documents to be referred from the first page to a request target server which stores the second page, and including a request page information which contains a request page identifier for identifying the second page in the system and a request target server identifier for identifying the request target server in the system;

third computer readable program code means for causing said computer to generate a source information message including a source information which contains the source server identifier and the source page identifier obtained from the page message transferred by the first computer readable program code means, and the request page identifier and the request target server identifier obtained from the request message transferred by the second computer readable program code means; and fourth computer readable program code means for causing said computer to transmit the source information message to said one server.

* * * * *